(12) United States Patent
Terasawa et al.

(10) Patent No.: US 12,472,826 B2
(45) Date of Patent: Nov. 18, 2025

(54) VEHICLE MANAGEMENT METHOD, VEHICLE MANAGEMENT SYSTEM, AND COMPUTER SYSTEM

(71) Applicant: TOYOTA JIDOSHA KABUSHIKI KAISHA, Toyota (JP)

(72) Inventors: Yuko Terasawa, Tokyo (JP); Tomoyoshi Ueki, Toyota (JP); Masahiro Kagami, Nagoya (JP); Yasuhide Kurimoto, Kasugai (JP); Hiroshi Yamasaki, Nagoya (JP); Kenji Zaitsu, Nisshin (JP); Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 18/382,687

(22) Filed: Oct. 23, 2023

(65) Prior Publication Data

US 2024/0208333 A1   Jun. 27, 2024

(30) Foreign Application Priority Data

Dec. 22, 2022   (JP) .................................. 2022-205707

(51) Int. Cl.
| | |
|---|---|
| *B60L 3/00* | (2019.01) |
| *G01R 31/367* | (2019.01) |
| *G01R 31/392* | (2019.01) |
| *G06Q 30/0283* | (2023.01) |
| *G06Q 30/06* | (2023.01) |

(52) U.S. Cl.
CPC .......... *B60L 3/0046* (2013.01); *G01R 31/367* (2019.01); *G01R 31/392* (2019.01); *G06Q 30/0284* (2013.01); *G06Q 30/06* (2013.01)

(58) Field of Classification Search
CPC ... B60L 3/0046; G01R 31/392; G01R 31/367; G06Q 30/0284; G06Q 30/06
See application file for complete search history.

(56) References Cited

U.S. PATENT DOCUMENTS

| | | | |
|---|---|---|---|
| 9,285,433 B2* | 3/2016 | Kurimoto | ............... G06F 15/00 |
| 10,942,223 B1* | 3/2021 | Malloy | ............... H01M 10/425 |
| 11,619,676 B2* | 4/2023 | Malloy | ............... H01M 10/425 |
| | | | 702/63 |
| 2013/0090872 A1 | 4/2013 | Kurimoto | |
| 2018/0188332 A1* | 7/2018 | Newman | ................ B60K 35/10 |
| 2021/0181263 A1* | 6/2021 | Hametner | ............ G01R 31/367 |
| 2022/0113356 A1* | 4/2022 | Kasselman | ......... H01M 10/482 |

FOREIGN PATENT DOCUMENTS

WO    2011/162014 A1    12/2011

* cited by examiner

*Primary Examiner* — Ramsey Refai
(74) *Attorney, Agent, or Firm* — Oliff PLC

(57) ABSTRACT

A vehicle management method includes: obtaining first SOH information that indicates a degree of deterioration of a power storage device of a vehicle based on charge data on the power storage device measured while the vehicle is executing external charge of the power storage device using power supplied externally; obtaining second SOH information that indicates the degree of deterioration of the power storage device based on history data about deterioration of the power storage device recorded in the vehicle when the vehicle is not executing external charge of the power storage device; and determining whether the history data have been tampered with by comparing the first SOH information and the second SOH information.

9 Claims, 10 Drawing Sheets

VEHICLE MANAGEMENT METHOD, VEHICLE MANAGEMENT SYSTEM, AND COMPUTER SYSTEM

CROSS-REFERENCE TO RELATED APPLICATION

This application claims priority to Japanese Patent Application No. 2022-205707 filed on Dec. 22, 2022, incorporated herein by reference in its entirety.

BACKGROUND

1. Technical Field

The present disclosure relates to a vehicle management method, a vehicle management system, and a computer system.

2. Description of Related Art

WO 2011/162014 discloses a vehicle management system (more specifically, a battery management system that manages a battery mounted on a vehicle). In the vehicle management system, the vehicle measures the capacity (full charge capacity) of the battery, the internal resistance, and the number of times when an upper limit voltage is exceeded, and measured data are accumulated in the vehicle as history information. The measured data (history information) accumulated in the vehicle are transmitted to a data station every three months, for example. The data station determines that the battery cannot be reused if there is any problem in the measured data, and determines that the battery can be reused if there is no problem with the measured data.

SUMMARY

In the vehicle management system described in WO 2011/162014, battery data measured by the vehicle are accumulated in the vehicle as history information (history data), and the history data accumulated in the vehicle are transmitted to the data station. The data station determines based on the history data whether the battery can be reused.

However, WO 2011/162014 does not discuss at all the possibility that the history data held by the vehicle may be tampered with. In the vehicle management system described in WO 2011/162014, it may not be correctly determined whether the battery can be reused if the history data on the battery recorded in the vehicle are tampered with.

The present disclosure provides a vehicle management method, a vehicle management system, and a computer system that allow confirming whether history data on a power storage device of a vehicle have been tampered with.

A first aspect of the present disclosure provides a vehicle management method to be described below. The vehicle management method includes: obtaining first state-of-health (SOH) information that indicates a degree of deterioration of a power storage device of a vehicle based on charge data on the power storage device measured while the vehicle is executing external charge of the power storage device using power supplied externally; obtaining second SOH information that indicates the degree of deterioration of the power storage device based on history data about deterioration of the power storage device recorded in the vehicle when the vehicle is not executing external charge of the power storage device; and determining whether the history data have been tampered with by comparing the first SOH information and the second SOH information.

During external charge of the power storage device, data (charge data) that directly indicate the electrical characteristics of the power storage device can be acquired. First SOH information that indicates the degree of deterioration of the power storage device with high precision can be obtained using such charge data. On the other hand, second SOH information that indicates the degree of deterioration of the power storage device can be obtained using history data about deterioration of the power storage device recorded in the vehicle when the vehicle is not executing external charge of the power storage device. In general, the period for which the vehicle is not executing external charge is longer than the period for which the vehicle is executing external charge. The second SOH information is more advantageous in order to acquire the degree of deterioration of the power storage device for the period for which the vehicle is not executing external charge. However, the history data recorded in the vehicle may be tampered with. Thus, in the above vehicle management method, it is determined whether the history data have been tampered with by comparing the first SOH information and the second SOH information. For example, it is highly likely that the history data have been tampered with if there is a significant deviation between the degree of deterioration indicated by the first SOH information and the degree of deterioration indicated by the second SOH information. With such a method, it is possible to confirm whether the history data on the power storage device of the vehicle have been tampered with.

A parameter that indicates the degree of deterioration of the power storage device is generally referred to as a "state of health (SOH)". Examples of the SOH include a capacity retention rate and an internal resistance. As the degree of deterioration of the power storage device becomes greater, the capacity of the power storage device becomes lower, and the internal resistance of the power storage device becomes higher. As the degree of deterioration of the power storage device becomes greater, the capacity retention rate of the power storage device becomes lower.

The above vehicle management method may be configured as described below.

The above vehicle management method may further have the following feature. The vehicle management method may further include determining whether the charge data for obtaining the first SOH information have been measured. The determining as to whether the history data have been tampered with may include determining whether the history data have been tampered with by comparing the first SOH information that indicate a present degree of deterioration of the power storage device and the second SOH information when it is determined that the charge data for obtaining the first SOH information have been measured.

With the above method, it is possible to confirm whether the history data on the power storage device of the vehicle have been tampered with when charge data for obtaining first SOH information are acquired. In addition, the first SOH information and the second SOH information can be easily compared under the same condition, since the first SOH information and the second SOH information indicate the degrees of deterioration at the same timing. This enhances the precision in determining tampering.

It may be determined that charge data for obtaining first SOH information have been measured when external charge that meets a predetermined requirement is executed in the vehicle. For example, it may be determined that charge data for obtaining first SOH information have been measured when the power storage device of the vehicle is subjected to external charge in which a charge time or a charge power amount exceeds a predetermined value and charge data are measured during the external charge.

The above vehicle management method may further have the following feature. The determining as to whether the history data have been tampered with may include: obtaining an SOH deviation degree that indicates a degree of deviation between the degree of deterioration indicated by the first SOH information and the degree of deterioration indicated by the second SOH information; obtaining a time deviation degree that indicates a degree of deviation between a time for the first SOH information and a time for the second SOH information; and determining based on the SOH deviation degree and the time deviation degree whether the history data have been tampered with.

Since the deterioration of the power storage device progresses as the time elapses, the degrees of deterioration indicated by the first SOH information and the second SOH information occasionally do not coincide with each other, even if both the first SOH information and the second SOH information are correct, when the time for the first SOH information and the time for the second SOH information are different from each other. Thus, the precision in determining tampering is enhanced by comparing the degrees of deterioration indicated by the first SOH information and the second SOH information and the times for the first SOH information and the second SOH information as in the above method. The time for SOH information indicates the degree of deterioration at what time is indicated by the SOH information.

Any of the above vehicle management methods may further have the following feature. The vehicle management method may further include deleting or invalidating a tampered portion of the history data when it is determined that the history data have been tampered with.

With the above method, it is possible to appropriately obtain second SOH information using a non-tampered portion of the history data after tampering with the history data has been detected.

Any of the above vehicle management methods may further have the following feature. The vehicle management method may further include: calculating a lease fee of the vehicle or the power storage device based on the second SOH information when the vehicle or the power storage device is provided to a vehicle user by lease; and informing the vehicle user of the calculated lease fee.

With the above method, it is possible to inform the vehicle user of the lease fee calculated based on the reliable second SOH information while confirming whether the history data have been tampered with. The informing method may be either display or voice. Any of the above vehicle management methods may further have the following feature. The charge data on the power storage device may indicate at least one of a current and a voltage of the power storage device during external charge. The history data on the power storage device may indicate at least one of a state of the power storage device taken while the vehicle is traveling and a state of the power storage device taken when the vehicle is left alone. Each of the first SOH information and the second SOH information may indicate a capacity retention rate or an internal resistance of the power storage device.

With the above method, it is easy to adequately obtain the first SOH information and the second SOH information. In order to obtain the degree of deterioration of the power storage device with high precision, the charge data preferably indicate both a current and a voltage. The internal resistance of the power storage device can be obtained with high precision from the relationship (e.g. the slope of a graph) between the current and the voltage indicated by the charge data. The charge data may further indicate the temperature of the power storage device at the time of start of charge or during charge. The history data on the power storage device may indicate at least one of the current, voltage, and temperature of the power storage device and the remaining amount of power stored in the power storage device taken while the vehicle is traveling as the state of the power storage device taken while the vehicle is traveling. The history data on the power storage device may indicate at least one of the temperature of the power storage device and the remaining amount of power stored in the power storage device taken while the vehicle is left alone as the state of the power storage device taken when the vehicle is left alone.

A certain aspect provides a program that causes a computer to execute any of the above vehicle management methods. Another aspect provides a computer device that distributes the program.

A second aspect of the present disclosure provides a computer system to be described below.

The computer system includes: one or more processors; and one or more storage devices that store a program that causes the one or more processors to execute any of the above vehicle management methods.

With the above computer system, the vehicle management method discussed earlier is executed suitably. The above computer system may include a plurality of processors mounted on separate computers and a plurality of storage devices mounted on separate computers. For example, the above computer system may include a processor and a storage device mounted on a vehicle and a processor and a storage device mounted a stationary server. The above computer system may be implemented on the cloud.

A third aspect of the present disclosure provides a vehicle management system to be described below. The vehicle management system includes: a vehicle including a power storage device and a storage device; power supply equipment that supplies power for external charge of the power storage device; and a server configured to be communicable with each of the vehicle and the power supply equipment. The vehicle is configured to record history data about deterioration of the power storage device in the storage device when external charge of the power storage device is not executed. The server is configured to acquire charge data on the power storage device from the vehicle or the power supply equipment after the vehicle executes external charge of the power storage device using the power supply equipment, the charge data being measured during the external charge, obtain first SOH information that indicates a degree of deterioration of the power storage device based on the charge data on the power storage device, acquire the history data on the power storage device from the vehicle or the power supply equipment, obtain second SOH information that indicates a degree of deterioration of the power storage device based on the history data on the power storage device, and determine whether the history data have been tampered with by comparing the first SOH information and the second SOH information.

With the above system, the vehicle management method discussed earlier is executed suitably. The above vehicle may be an electrified vehicle (xEV) that uses electric power in all or some of power sources. Examples of the xEV include a battery electric vehicle (BEV), a plug-in hybrid electric vehicle (PHEV), a fuel cell electric vehicle (FCEV), etc.

With the present disclosure, it is possible to provide a vehicle management method, a vehicle management system, and a computer system that allow confirming whether history data on a power storage device of a vehicle have been tampered with.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
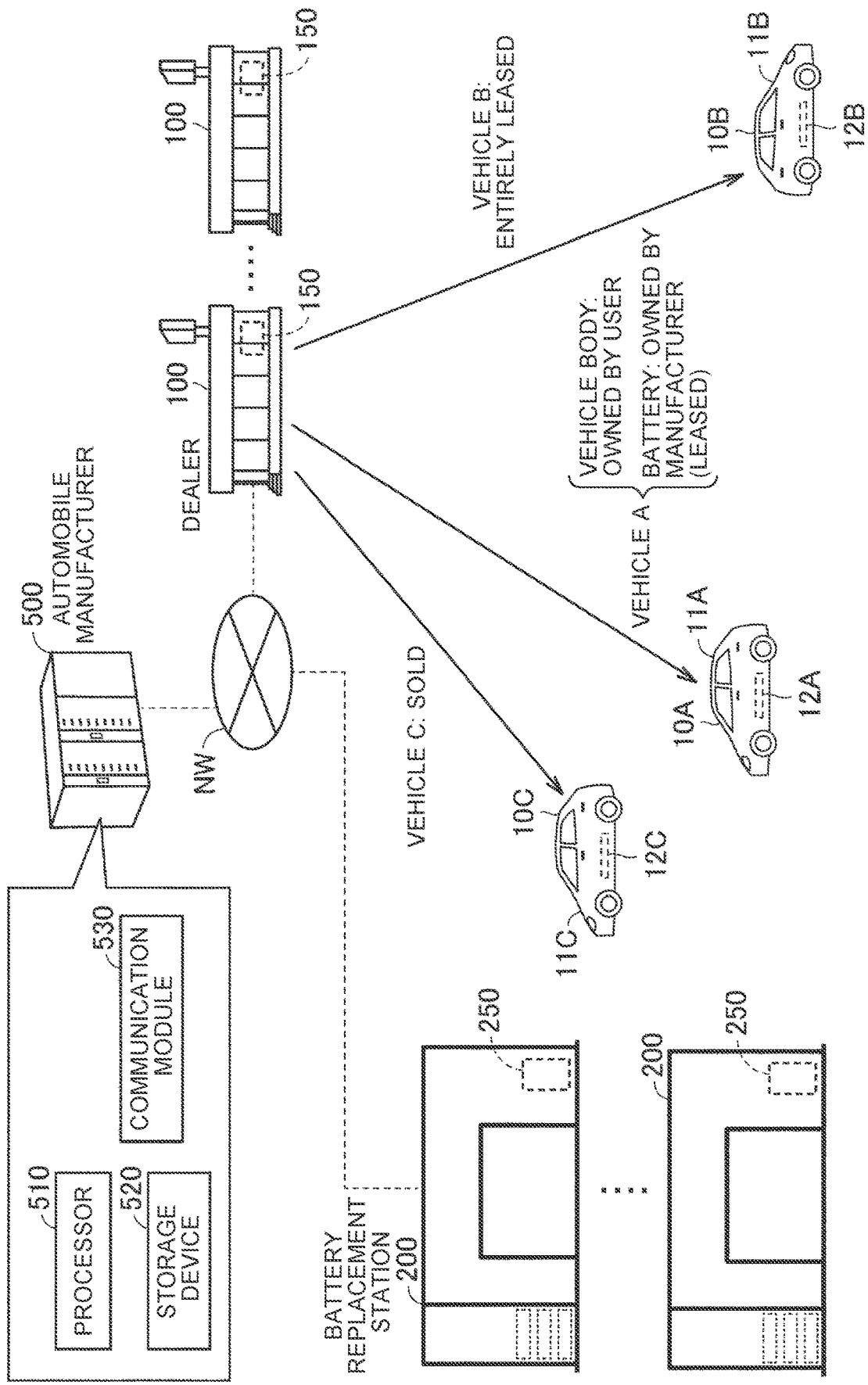
FIG. 1 is a diagram illustrating an overview of a vehicle management system according to an embodiment of the present disclosure.

FIG. 1 is a diagram illustrating an overview of a vehicle management system according to this embodiment. The vehicle management system illustrated in FIG. 1 includes dealers 100, battery replacement stations (hereinafter denoted as "BSta") 200, and a management center 500.

The management center 500 is a server that provides a lease service for automobiles. The management center 500 manages information about the lease service. The management center 500 belongs to an automobile manufacturer, for example. In this embodiment, the automobile manufacturer also acts as a lease business operator.

The management center 500 includes a processor 510, a storage device 520, and a communication module 530. The processor 510 includes a central processing unit (CPU), for example. The storage device 520 is configured to be able to save stored information. The storage device 520 may include a hard disk (HD) drive or a solid state drive (SSD). The communication module 530 is connected to a communication network NW through a wire, for example. The dealers 100 each include a server 150. The BSta 200 each include a server 250. Each of the servers 150 and 250 is also connected to the communication network NW through a wire, for example. The management center 500, the servers 150, and the servers 250 are configured to be communicable with each other via the communication network NW. The communication network NW is a wide area network built by the Internet and wireless base stations, for example. The communication network NW may include a cellular telephone network.

An automobile manufacturer sells or leases manufactured vehicles through the dealers 100. In this embodiment, a plurality of types of leasing methods including partial leasing and entire leasing is adopted. The server 150 manages information (vehicle information) about vehicles provided from the dealer 100 as distinguished by a vehicle identifier (ID). The server 150 consecutively transmits the latest vehicle information to the management center 500. The dealer 100 may lease a power storage device 12A of a vehicle 10A (vehicle A) illustrated in FIG. 1 to a user through partial leasing, for example. Of the vehicle 10A (partially leased vehicle), a vehicle body 11A belongs to the user, and the power storage device 12A belongs to the automobile manufacturer. Alternatively, the dealer 100 may lease a vehicle 10B (vehicle B) to a user through entire leasing, for example. Of the vehicle 10B (entirely leased vehicle), the entire vehicle (vehicle body 11B and power storage device 12B) belongs to the automobile manufacturer. Alternatively, the dealer 100 may sell a vehicle 10C (vehicle C) illustrated in FIG. 1 to a user. Of the vehicle 10C (sold vehicle), the entire vehicle (vehicle body 11C and power storage device 12C) belongs to the user.

A vehicle user that has made a lease contract with a lease business operator can receive a lease service for a predetermined unit period by paying a lease fee for the unit period. The period for which a lease fee has been paid corresponds to a lease period. In this embodiment, the length (unit period) of the lease period is defined as one month.

In this embodiment, when a clerk at the dealer 100 sells or leases the vehicle 10, identification information (vehicle ID) on the vehicle 10, specification information, and contract information are written into each of a storage device (not illustrated) of the server 150 and a storage device (e.g. a storage device 111b illustrated in FIG. 2 to be discussed later) of the vehicle 10. The server 150 also transmits such information to the management center 500, and the management center 500 saves such information in the storage device 520.

The specification information on the vehicle 10 indicates the specifications of various components mounted on the vehicle 10, in addition to information on the dimensions and the running performance of the vehicle 10. The specification information on the vehicle 10 indicates the specifications (e.g. capacity and maximum output) of the power storage device, for example. The specification information on the vehicle 10 also includes information that indicates the degree of deterioration of the power storage device mounted on the vehicle 10 at the time of start of use. The start of use indicates the time when the vehicle user has started the use of the power storage device (e.g. at the time of start of lease or at the time of purchase of the vehicle). In this embodiment, a capacity retention rate is used as a parameter (state of health: SOH) that indicates the degree of deterioration of the power storage device. The capacity of the power storage device corresponds to the amount of electricity stored in the power storage device in the fully charged state. The capacity retention rate represents the proportion of the present capacity to the initial capacity in 0 to 100%, for example.

However, this is not limiting, and an internal resistance may be used in place of the capacity retention rate.

The contract information includes the date and time of the contract, the type of the contact (e.g. partial leasing/entire leasing/sales), and price information (e.g. lease fee or sales price). The contact information for a lease contract further includes a lease period.

In this embodiment, a plurality of dealers 100 and a plurality of BSta 200 are provided so as to cover the entire area to be covered by the vehicle management system. The BSta 200 are configured to replace a power storage device for a vehicle. The power storage device leased by the automobile manufacturer to a vehicle user through the dealer 100 is returned from the vehicle user to the BSta 200. In this embodiment, a secondary battery is used as the power storage device. However, the power storage device may be any device that can reserve power.

Figure 2:
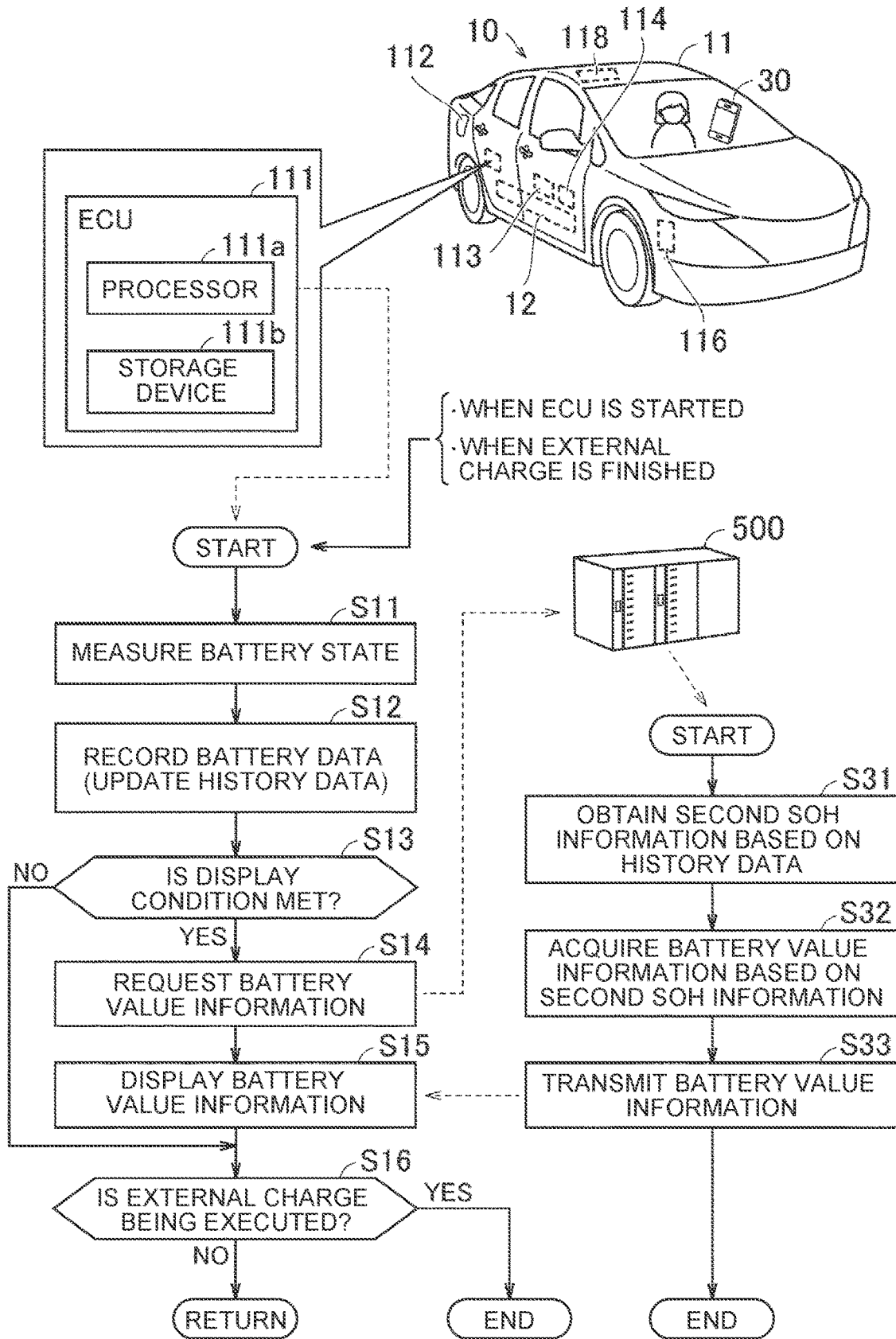
FIG. 2 illustrates a process of recording history data on a vehicle illustrated in FIG. 1.

In the following description, a vehicle provided by the dealer 100 is occasionally referred to as a "vehicle 10". The vehicle 10 according to this embodiment is one of the vehicles A, B, and C illustrated in FIG. 1. FIG. 2 illustrates the configuration of the vehicle 10 and a process of recording history data on the vehicle 10.

With reference to FIG. 2, the vehicle 10 includes a vehicle body 11 and a battery 12 mounted on the vehicle body 11. The vehicle 10 is configured to be able to travel using power from the battery 12. The vehicle 10 is a battery electric vehicle (BEV) that does not include an internal combustion engine, for example. A known vehicle power storage device (e.g. a liquid secondary battery or an all-solid-state secondary battery) can be used as the battery 12. Examples of the secondary battery for vehicles include a lithium-ion battery and a nickel metal hydride battery. A plurality of secondary batteries may form an assembled battery.

The vehicle body 11 includes an ECU 111, an inlet 112, a charger 113, a battery management system (BMS) 114, a drive device 116, and a communication device 118. The vehicle body 11 further includes a human machine interface (HMI) (not illustrated). The ECU 111 includes a processor 111a and a storage device 111b. The storage device 111b includes a program to be executed by the processor 111a. The term "ECU" means an electronic control unit. A control system (including the ECU 111) of the vehicle 10 is supplied with power from an auxiliary battery (not illustrated).

Power input to the inlet 112 from the outside of the vehicle (e.g. EVSE to be discussed later) is supplied to the charger 113. The charger 113 generates charge power in accordance with an instruction from the ECU 111 using power supplied from the inlet 112, and outputs the generated charge power to the battery 12. The charger 113 includes a power conversion circuit (e.g. at least one of a DC/DC conversion circuit and an AC/DC conversion circuit), and generates charge power using the circuit. The configuration of the vehicle 10 may be changed so as to be able to execute external power supply (power supply from the battery 12 to the outside of the vehicle). For example, the charger 113 may be changed to a charger/discharger.

The battery 12 is provided with the BMS 114. The BMS 114 includes various sensors (e.g. a current sensor, a voltage sensor, and a temperature sensor) that detect the state of the battery 12, and consecutively outputs the detection results to the ECU 111. The ECU 111 controls the charger 113 while checking the state of the battery 12 being charged based on a detection signal from the BMS 114.

The drive device 116 includes a motor generator (MG) and a circuit (power control unit (PCU)) that controls the MG. The MG functions as a travel motor of the vehicle 10. The MG is driven by the PCU, and rotates drive wheels of the vehicle 10. The MG also regenerates power during braking (deceleration) of the vehicle 10, and outputs generated power to the battery 12. The PCU includes an inverter and a DC/DC converter, for example. The PCU is controlled by the ECU 111, and drives the MG using power supplied from the battery 12. The vehicle 10 may include any number of travel motors.

The communication device 118 includes a communication interface for communication with devices (e.g. the management center 500 and a portable terminal 30) outside the vehicle. The ECU 111 communicates with external devices through the communication device 118.

The portable terminal 30 is configured to be carried by a user. The portable terminal 30 is carried and operated by a user (vehicle manager) of the vehicle 10. In this embodiment, a smartphone equipped with a touch panel display is used as the portable terminal 30. The smartphone includes a built-in computer, and has a speaker function. However, this is not limiting, and examples of the portable terminal 30 include a laptop computer, a tablet terminal, a portable gaming device, a wearable device (such as a smartwatch, smartglasses, and smartgloves), an electronic key, etc.

Application software (hereinafter referred to as a "mobile app") for using a service provided by the management center 500 is installed in the portable terminal 30. The mobile app allows identification information (terminal ID) on the portable terminal 30 to be registered in the management center 500 in connection with identification information (vehicle ID) on the corresponding vehicle 10. The portable terminal 30 can exchange information with each of the management center 500, the server 250, and the server 150 through the mobile app.

The ECU 111 executes a series of processes in S11 to S16 illustrated in FIG. 2. The series of processes is started by the ECU 111 activated in response to a request from a user. The symbol "S" in the flowchart means a step.

In S11, the ECU 111 measures the state (e.g. the temperature, current, voltage, and state of charge (SOC)) of the battery 12 based on a detection signal from the BMS 114. In S12, the ECU 111 records the measured battery data in the storage device 111b in connection with the detection time. The battery data (data that indicate the state of the battery 12) recorded in the vehicle 10 in S12 correspond to history data about deterioration of the battery 12. The state of charge (SOC) indicates the remaining amount of stored power, and represents the proportion of the present amount of stored power to the amount of stored power in the fully charged state in 0 to 100%, for example. The SOC may be measured using a known method, and at least one of a current integration method, an open circuit voltage (OCV) estimation method, an equivalent circuit model method, and a non-linear Kalman filter method may be used, for example.

Subsequently, in S13, the ECU 111 determines whether a predetermined display condition is met. The display condition is met when the ECU 111 is requested to display battery value information from a user terminal (e.g. an in-vehicle HMI or the portable terminal 30) for the vehicle 10 in response to a user operation, for example. For a leased vehicle (vehicle A or vehicle B), the display condition is met also when the remaining time until the termination of the lease period becomes shorter than a predetermined time (e.g. one to three days before the date of the termination of the lease period). However, this is not limiting, and the display condition may be set as desired.

When the display condition is met (YES in S13), the processes in S14 and S15 are executed, and thereafter the process proceeds to S16. When the display condition is not met (NO in S13), the process proceeds to S16 without executing the processes in S14 and S15.

In S16, the ECU 111 determines whether the vehicle 10 is executing external charge of the battery 12. In the external charge, the power storage device mounted on the vehicle is charged with power supplied from the outside of the vehicle. When the vehicle 10 is not executing external charge of the battery 12 (NO in S16), the process returns to the first step (S11). Therefore, the processes in S11 and S12 are repeatedly executed when the vehicle 10 is not executing external charge of the battery 12. The history data held by the vehicle 10 are updated each time the process in S12 is executed. The processes in S11 and S12 are executed and the state of the battery 12 is measured and recorded also while the vehicle 10 is traveling and when the vehicle is left alone. Therefore, the history data on the battery 12 recorded in the vehicle 10 include data that indicate the current, voltage, temperature, and SOC of the battery 12 taken while the vehicle 10 is traveling and data that indicate the temperature and SOC of the battery 12 taken when the vehicle 10 is left alone.

When the vehicle 10 starts external charge of the battery 12, the result of the determination in S16 is YES, and the series of processes illustrated in FIG. 2 is ended. When the external charge is finished, however, the series of processes in S11 to S16 illustrated in FIG. 2 is resumed (see S30 in FIG. 4 to be discussed later).

When the display condition is met (YES in S13), the ECU 111 requests battery value information from the management center 500 in S14. Specifically, the ECU 111 transmits, to the management center 500, a first request signal that includes identification information (vehicle ID) on the vehicle 10 and at least a part of the history data (battery data) recorded in the vehicle 10 in S12. The first request signal includes history data since a reference time until the present time, for example. The reference time may be the time of start of use (the time when the user has started to use the battery 12). In the second and subsequent transmissions (S14), the ECU 111 may transmit only an added portion of the history data.

When the first request signal from the vehicle 10 (ECU 111) is received, the management center 500 executes the processes in S31 to S33 to be described below. The management center 500 may save the history data included in the received first request signal in the storage device 520 in connection with identification information (vehicle ID) on the vehicle 10.

In S31, the management center 500 obtains second SOH information that indicates the degree of deterioration of the battery 12 based on the history data (history data about the deterioration of the battery 12 recorded in the vehicle 10) received from the vehicle 10.

Specifically, the history data include temperature data (e.g. graph data that indicate transitions in temperature or a histogram that indicates the frequencies of temperature ranges) on the battery 12 taken while the vehicle 10 is traveling or while the vehicle 10 is left alone. The deterioration of the battery 12 tends to progress when the temperature of the battery 12 goes out of a normal range of use. For example, the deterioration of the battery 12 progresses to a greater degree as the battery 12 is at a high temperature (e.g. a temperature exceeding a heat-resistant threshold) for a longer time. In addition, the deterioration of the battery 12 progresses to a greater degree as the battery 12 is at a low temperature (e.g. a temperature below a cold-resistant threshold) for a longer time. Therefore, the management center 500 can acquire the degree of progress of the deterioration of the battery 12 due to the temperature based on the temperature data on the battery 12 included in the history data.

The history data also include SOC data (e.g. graph data that indicate transitions in SOC or a histogram that indicates the frequencies of SOC ranges) on the battery 12 taken while the vehicle 10 is left alone. The deterioration of the battery 12 tends to progress as the battery 12 is left alone with a large remaining amount of stored power (e.g. with the SOC exceeding a deterioration threshold) for a longer time. Therefore, the management center 500 can acquire the degree of progress of the deterioration of the battery 12 due to being left alone in a high SOC state based on the SOC data on the battery 12 included in the history data.

The history data also include data that indicate the current, voltage, and SOC of the battery 12 taken while the vehicle 10 is traveling. The deterioration of the battery 12 tends to progress as the number of times when the battery 12 is overcharged (e.g. charged to a state in which charge power exceeds a charge endurance value or a state in which the SOC exceeds the upper limit value of the recommended range) is increased. The deterioration of the battery 12 also tends to progress as the number of times when the battery 12 is overdischarged (e.g. discharged to a state in which discharge power exceeds a discharge endurance value or a state in which the SOC falls below the lower limit value of the recommended range) is increased. Therefore, the management center 500 can acquire the degree of progress of the deterioration of the battery 12 due to charge and discharge during travel of the vehicle 10 based on data that indicate the current, voltage, and SOC of the battery 12 included in the history data.

The management center 500 converts the degree of progress of the deterioration of the battery 12 obtained from the history data on the battery 12 into an amount of reduction in the capacity retention rate using conversion information (such as a formula, a map, and a model) determined in accordance with the properties of the battery 12, for example. Then, the management center 500 obtains the capacity retention rate of the battery 12 at the present time based on the capacity retention rate (specification information) at the reference time and the amount of reduction in the capacity retention rate corresponding to the degree of progress of the deterioration since the reference time until the present time. Consequently, second SOH information that indicates the capacity retention rate of the battery 12 at the present time can be obtained. In this embodiment, the degree of deterioration of the battery 12 is represented as the capacity retention rate. The capacity retention rate becomes lower as the degree of deterioration of the battery 12 becomes greater.

The conversion information is stored in advance in the storage device 520 of the management center 500, for example. The conversion information may be fixed information, or may be updated regularly. The conversion information may be provided for each of evaluation items. The evaluation items may include the four items (temperature, being left alone in a high SOC state, overcharge during travel, and overdischarge during travel) discussed above, two or three items selected from the four items discussed above, or may be one item (e.g. temperature). The conversion information may be used to convert the degree of progress of the deterioration into an amount of increase in the internal resistance, rather than into an amount of reduction in the capacity retention rate. The method of obtaining the SOH of the battery 12 is not limited to that discussed above, and any method may be used.

Subsequently, in S32, the management center 500 acquires battery value information based on the capacity retention rate of the battery 12 indicated by the second SOH information obtained in S31. The battery value information is price information fluctuated in accordance with the value of the battery. The management center 500 evaluates the value of the battery 12 based on the SOH (capacity retention rate) of the battery 12. The management center 500 evaluates the value of the battery 12 as being higher as the capacity retention rate of the battery 12 is higher (i.e. as the degree of deterioration of the battery 12 is smaller). When the vehicle 10 is the vehicle A (partially leased vehicle), the management center 500 acquires battery value information that indicates the lease fee of the battery 12 for the next unit period (e.g. the next month). When the vehicle 10 is the vehicle B (entirely leased vehicle), the management center 500 acquires battery value information that indicates the lease fee of the vehicle 10 for the next unit period (e.g. the next month). When the vehicle 10 is the vehicle C (sold vehicle), the management center 500 acquires battery value information that indicates the sales price of the battery 12 (or the sales price of the vehicle 10). All of the lease fee of the battery 12, the lease fee of the vehicle 10, the sales price of the battery 12, and the sales price of the vehicle 10 are higher as the value of the battery 12 is higher.

Subsequently, in S33, the management center 500 transmits the battery value information acquired in S32 to the vehicle 10. When the battery value information is received from the management center 500, the ECU 111 of the vehicle 10 informs the vehicle user of one of the lease fee of the battery 12, the lease fee of the vehicle 10, and the sales price of the battery 12 (or the sales price of the vehicle 10) indicated by the battery value information received from the management center 500 in S15. Specifically, the ECU 111 controls the user terminal for the vehicle 10 (e.g. the in-vehicle HMI or the portable terminal 30) so as to display the lease fee or the sales price. Consequently, the vehicle user is informed of the lease fee of the battery 12 for the next unit period, the lease fee of the vehicle 10 for the next unit period, and the sales price of the battery 12 (or the sales price of the vehicle 10) when the vehicle 10 is the vehicle A, the vehicle B, and the vehicle C, respectively. After that, the process proceeds to S16 discussed earlier. The informing method is not limited to display, and may be voice.

Figure 3:
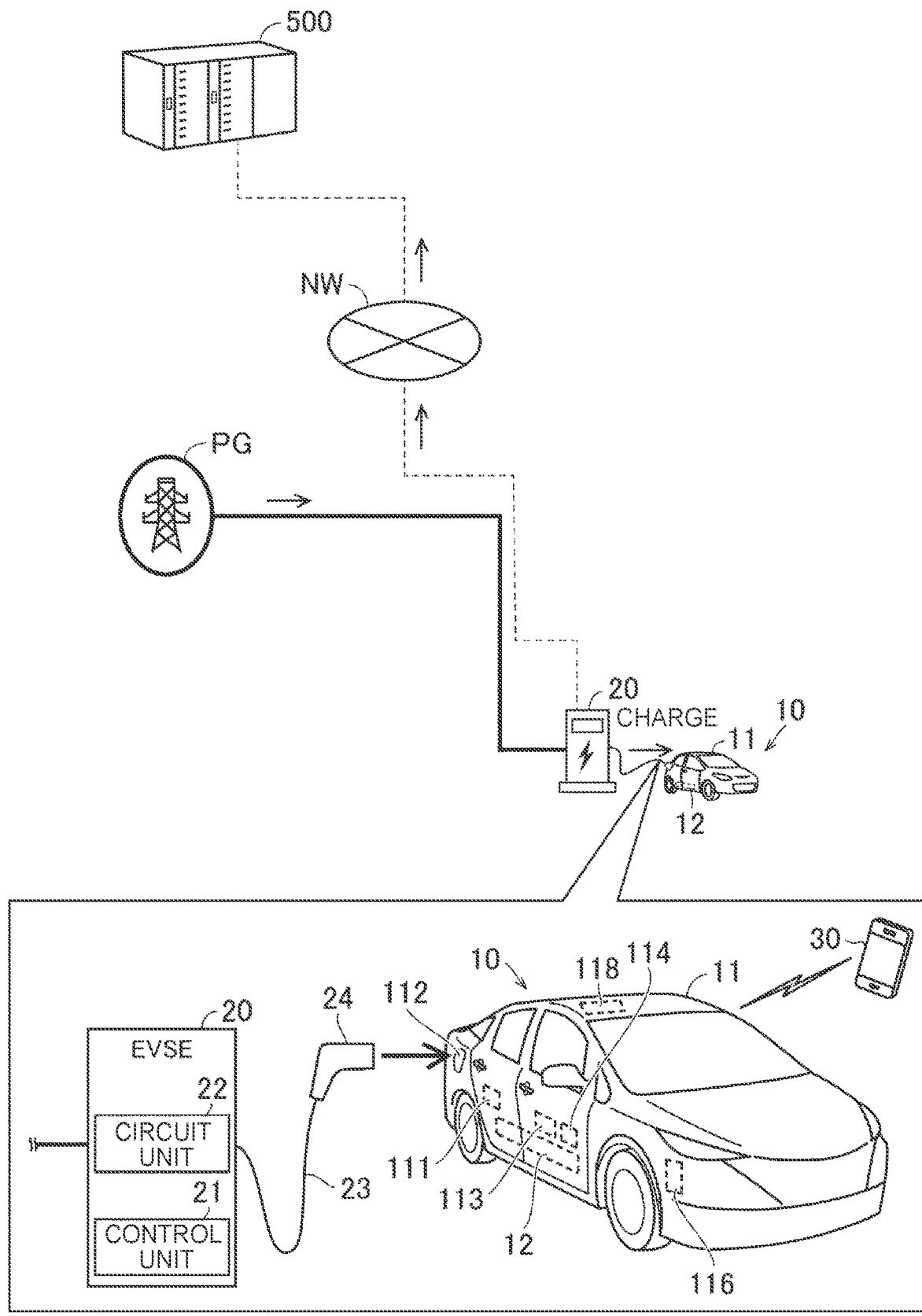
FIG. 3 illustrates external charge executed by the vehicle illustrated in FIG. 1.

FIG. 3 illustrates external charging of the battery 12 executed by the vehicle 10 using EVSE. The term "EVSE" means electric vehicle supply equipment.

With reference to FIG. 3, EVSE 20 is configured to supply power to the vehicle 10. The body of the EVSE 20 includes a built-in control unit 21 and circuit unit 22. The EVSE 20 further includes a charge cable 23 that extends from the body of the EVSE 20 toward the outside. The EVSE 20 outputs alternating current (AC) power, for example. However, this is not limiting, and the EVSE 20 may output direct current (DC) power.

The charge cable 23 includes a connector 24 provided at the distal end, and includes a communication line and a power line provided inside. The communication line of the charge cable 23 is electrically connected to the control unit 21. The control unit 21 includes a processor, a storage device, and a communication module, and is connected to the communication network NW through a wire, for example. The control unit 21 is configured to be communicable with the management center 500. The power line of the charge cable 23 is electrically connected to the circuit unit 22. The circuit unit 22 includes a circuit for supplying power to the vehicle 10, and is electrically connected to a power system PG. The power system PG is a power network built by power transmission/distribution facilities. The power system PG may be a commercial power source.

The inlet 112 of the vehicle 10 is configured to be removably connectable to the connector 24 (distal end portion) of the charge cable 23. When the connector 24 of the charge cable 23 connected to the body of the EVSE 20 is connected to the inlet 112 of the vehicle 10 in a parked state, the vehicle 10 is electrically connected to the EVSE 20 (plug-in state). The communication device 118 of the vehicle 10 includes a communication interface for communication with the EVSE 20 (control unit 21). The vehicle 10 in the plug-in state can communicate with the EVSE 20. On the other hand, while the vehicle 10 is traveling, for example, the vehicle 10 is not electrically connected to the EVSE 20 (plug-out state). The EVSE 20 further includes a connection detection circuit (not illustrated) that detects the state (plug-in state/plug-out state) of the connector 24.

The EVSE 20 and the power system PG are electrically connected to each other. Therefore, the vehicle 10 in the plug-in state is electrically connected to the power system PG. When the vehicle 10 in the plug-in state performs external charge, power supplied from the power system PG is output to the connector 24 through the circuit unit 22 of the EVSE 20, and input to the inlet 112. The vehicle 10 can execute external charge of the battery 12 using power supplied from the external EVSE 20. Specifically, the vehicle 10 executes external charge of the battery 12 through a process illustrated in FIG. 4 to be described below.

Figure 4:
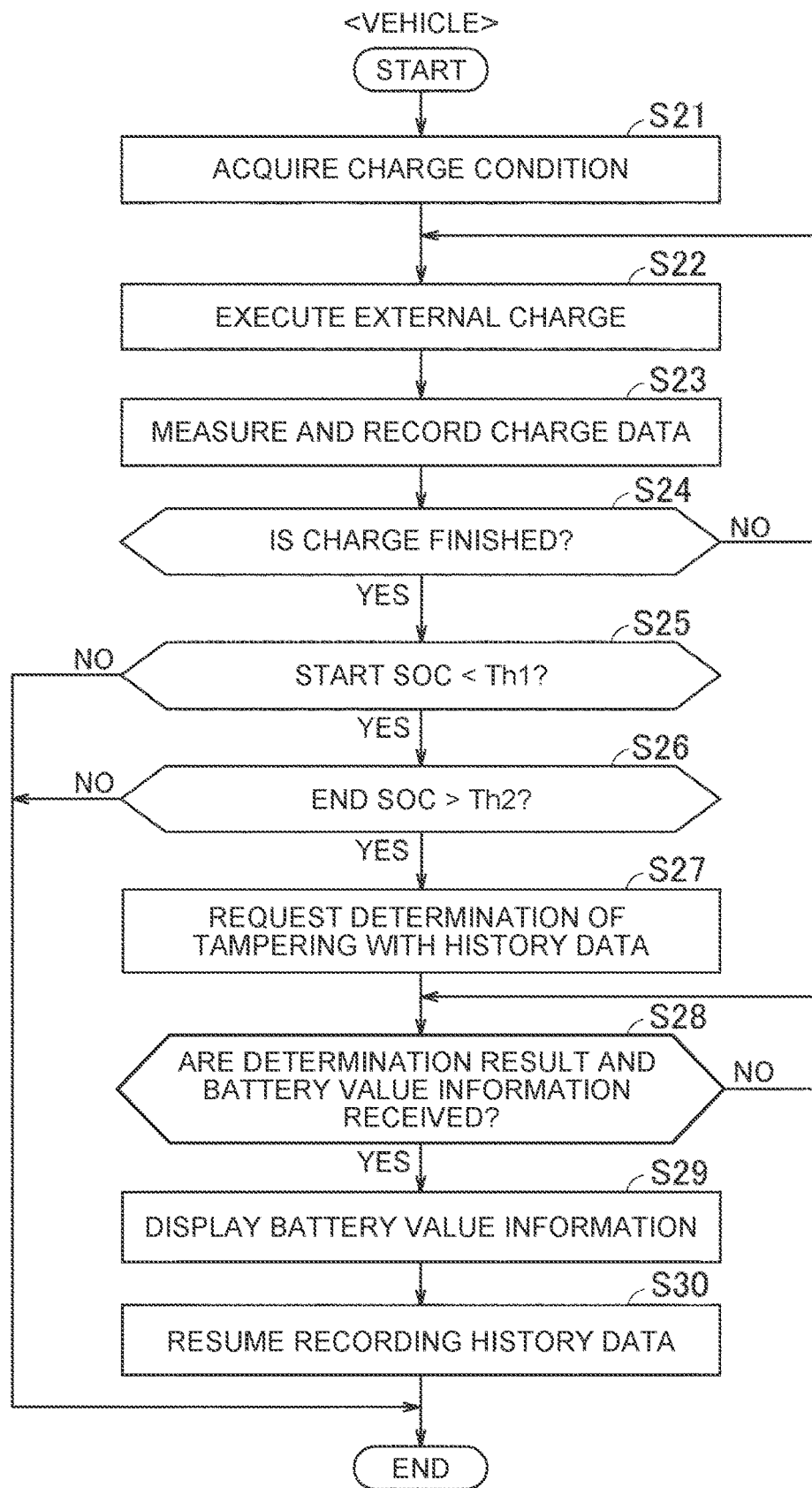
FIG. 4 is a flowchart illustrating a process related to the external charge executed by the vehicle illustrated in FIG. 1.

FIG. 4 is a flowchart illustrating a process related to the external charge executed by the vehicle 10. When a request for external charge is received, the ECU 111 suspends the series of processes illustrated in FIG. 2 discussed earlier, and starts a series of processes illustrated in FIG. 4. For example, when the vehicle 10 is brought into the plug-in state (state of being connected to the power supply equipment), the ECU 111 may be requested for external charge. When the vehicle 10 is in the plug-in state, in addition, the ECU 111 may be requested for external charge from the user terminal for the vehicle 10 or the power supply equipment in response to a user operation. The series of processes illustrated in FIG. 4 is started in a state (plug-in state) in which the vehicle 10 and the power supply equipment (e.g. the EVSE 20) are connected to each other.

With reference to FIG. 4, in S21, the ECU 111 acquires a charge condition (condition about external charge). The charge condition includes specification information (e.g. a power supply voltage and a maximum power supply current) on the power supply equipment connected to the vehicle 10, a condition (e.g. a charge end condition to be discussed later) specified by the vehicle user, the state of the vehicle 10 at the time of start of charge (e.g. the SOC of the battery 12 at the time of start of charge), and the present time (charge start time), for example.

Subsequently, in S22, the ECU 111 controls the charger 113 such that the battery 12 is charged with power supplied from the power supply equipment to the inlet 112 of the vehicle 10. Consequently, external charge of the battery 12 is executed. Further, in S23, the ECU 111 acquires charge data that indicate the state of the battery 12 during execution of external charge by measuring the state (e.g. temperature, current, voltage, and SOC) of the battery 12 based on a detection signal from the BMS 114. Then, the ECU 111 records the measured charge data in the storage device 111*b* in connection with the detection time.

Subsequently, in S24, the ECU 111 determines whether a charge end condition is met. The charge end condition may be a condition (e.g. the SOC at the time of end of charge or the charge time) specified by the user. When the charge end condition is not specified by the user, the charge end condition may be met when the SOC of the battery 12 reaches 100% (a value that indicates the fully charged state). In addition, the charge end condition may be met when the user requests end of charge.

When the charge end condition is not met (NO in S24), the process returns to S22. Therefore, the processes in S22 and S23 are repeatedly executed while the charge end condition is not met. Consequently, external charge is continuously executed (S22), and battery data (charge data) during external charge are measured and recorded (S23). When the charge end condition is met (YES in S24), the process proceeds to S25. Consequently, the processes in S22 and S23 are not executed, and external charge is ended.

In S25, the ECU 111 determines whether a start SOC (the SOC of the battery 12 at the time of start of charge) is less than a predetermined value (hereinafter denoted as "Th1"). When the start SOC is less than Th1 (YES in S25), the ECU 111 determines in S26 whether an end SOC (the SOC of the battery 12 at the time of end of charge) is more than a predetermined value (hereinafter denoted as "Th2"). Since it is immediately after external charge is ended, the end SOC corresponds to the present SOC of the battery 12. Th1 is preferably 40% or less, and is set to about 30%, for example. Th2 is preferably 70% or more, and is set to about 80%, for example.

In this embodiment, Th1 and Th2 correspond to thresholds for determining whether charge data enough to obtain first SOH information have been measured. Particularly, when the results of the determinations in both S25 and S26 are YES, it is meant that external charge has been executed in at least the SOC range from Th1 to Th2, and that charge data during external charge have been acquired. When the results of the determinations in both S25 and S26 are YES, it is considered that charge data for obtaining first SOH information have been measured, and the process proceeds to S27. When the result of the determination in either of S25 and S26 is NO, on the other hand, it is considered that charge data for obtaining first SOH information have not been measured, and the series of processes illustrated in FIG. 4 is ended without the process proceeding to S27.

The determination as to whether the process proceeds to S27 is not limited to S25 and S26, and is changeable as appropriate. For example, the ECU 111 may determine whether charge data enough to obtain first SOH information have been measured based on whether external charge has been executed for a charge time or a charge power amount exceeding a predetermined value, in place of S25 and S26.

In S27, the ECU 111 requests the management center 500 to determine tampering with the history data. Specifically, the ECU 111 transmits, to the management center 500, a second request signal that includes identification information (vehicle ID) on the vehicle 10, charge data (battery data measured during the current external charge) measured in S23, and the history data since the reference time until immediately before the start of external charge. When the request is received, the management center 500 executes determination of tampering with the history data, and transmits the determination result and the battery value information to the vehicle 10 (see FIG. 5 to be discussed later). The vehicle 10 and the management center 500 may directly communicate with each other through wireless communication, or may communicate with each other through a wire via the power supply equipment (e.g. the EVSE 20).

In S28, the ECU 111 determines whether the determination result and the battery value information have been received, and stands by until such reception (NO in S28). Upon such reception (YES in S28), the process proceeds to S29. The ECU 111 records the determination result received from the management center 500 in the storage device 111b in connection with the determination time. When the determination result indicates that the history data have been tampered with, the vehicle 10 also receives new history data in addition to the determination result and the battery value information.

In S29, the ECU 111 informs the vehicle user of the battery value information received from the management center 500. The process in S29 is the same as the process in S15 in FIG. 2, for example. In S29, however, the vehicle user is informed of the battery value information (see S48 in FIG. 5 to be discussed later) obtained using the first SOH information. Particularly, through the process in S29, the vehicle user is informed of the lease fee of the battery 12 for the next unit period, the lease fee of the vehicle 10 for the next unit period, and the sales price of the battery 12 (or the sales price of the vehicle 10) when the vehicle 10 is the vehicle A, the vehicle B, and the vehicle C, respectively. The informing method may be either display or voice.

Subsequently, in S30, the ECU 111 resumes a process of recording history data (more specifically, the series of processes in S11 to S16 illustrated in FIG. 2 discussed earlier). When the determination result indicates that the history data have been tampered with, however, the ECU 111 resumes a process of recording history data after updating the history data stored in the storage device 111b based on the new history data (history data from which a tampered portion has been deleted) received from the management center 500. This makes it possible to appropriately obtain second SOH information using a non-tampered portion of the history data. When the process in S30 is executed, the series of processes illustrated in FIG. 4 is ended.

Figure 5:
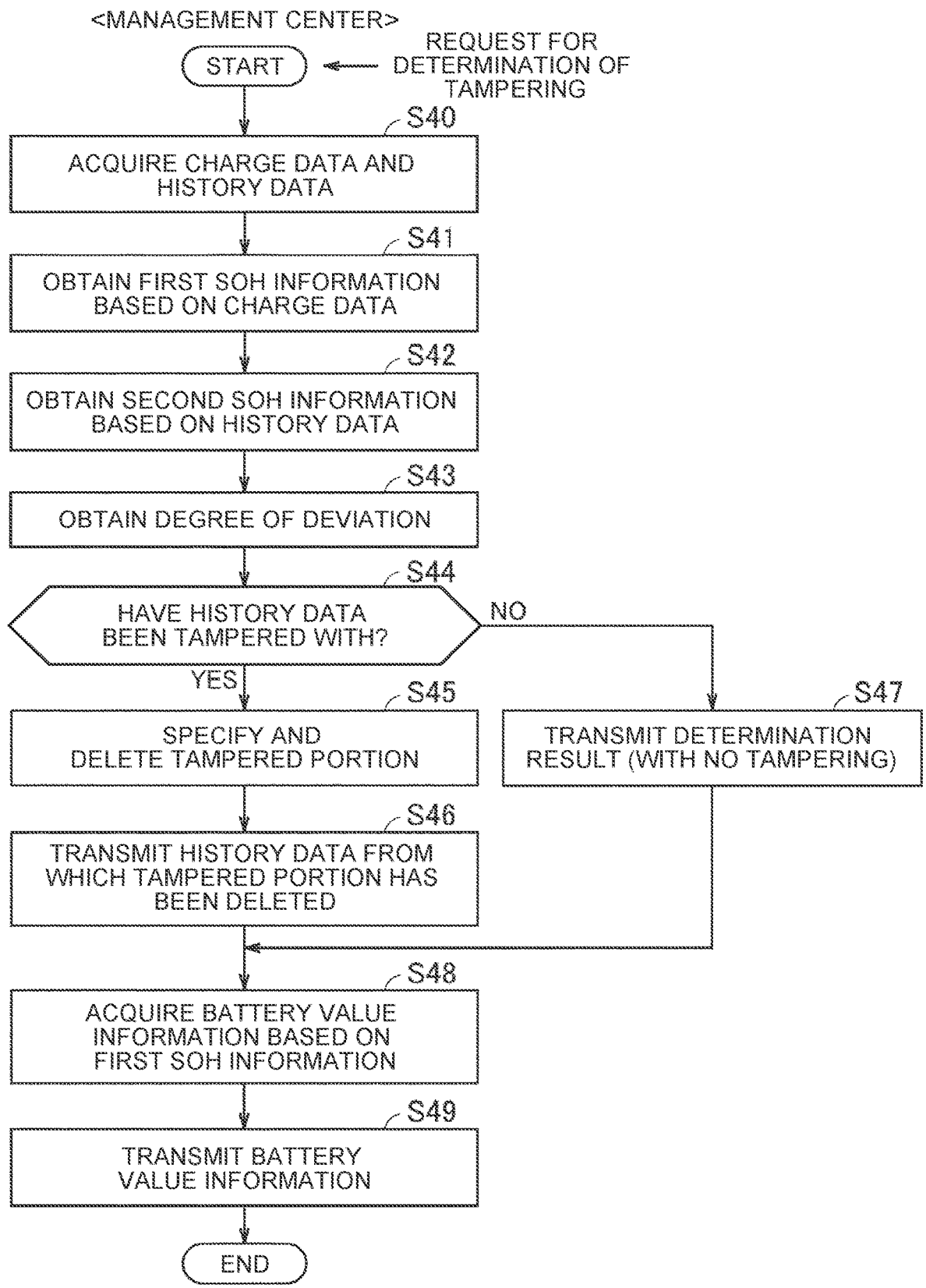
FIG. 5 is a flowchart illustrating a process related to determination of tampering with history data executed by a management center illustrated in FIG. 1.

FIG. 5 is a flowchart illustrating a process related to determination of tampering with history data executed by the management center 500. When the second request signal (S27 in FIG. 4) is received, the management center 500 starts a series of processes to be described below.

With reference to FIG. 5, in S40, the management center 500 acquires (extracts) charge data and history data included in the second request signal. The management center 500 may save the charge data and the history data included in the received second request signal in the storage device 520 in connection with identification information (vehicle ID) on the vehicle 10. The charge data may be transmitted from the power supply equipment (e.g. the EVSE 20) to the management center 500 not via the vehicle 10. For example, the power supply equipment may measure charge data during charge and transmit the charge data to the management center 500 after the charge is ended.

Subsequently, in S41, the management center 500 obtains first SOH information that indicates the degree of deterioration of the battery 12 based on the charge data.

Specifically, the charge data include data that indicate the current and the voltage of the battery 12 during external charge (e.g. graph data that indicate transitions in current and voltage during external charge). The management center 500 can obtain variations in the amount of power charged in the battery 12 and the remaining amount of power stored in the battery 12 during charge from the transitions in current and voltage of the battery 12 during external charge, for example. The management center 500 can obtain the capacity of the battery 12 based on the charge data. For example, the amount of power charged in the battery 12 until the battery 12 is brought from the empty state to the fully charged state corresponds to the capacity of the battery 12. However, the capacity of the battery 12 can also be obtained from charge data even if the battery 12 is not charged from the empty state to the fully charged state. For example, the capacity of the battery 12 can be obtained by doubling the amount of power charged in the battery 12 when the battery 12 is charged from a state with an SOC of 50% to the fully charged state. In this embodiment, the management center 500 obtains the capacity of the battery 12 using charge data in the SOC range from Th1 to Th2 (sec S25 and S26 in FIG. 4). The precision in capacity measurement can be enhanced by determining the SOC range in advance. Then, the management center 500 calculates the capacity retention rate of the battery 12 by dividing the obtained present capacity of the battery 12 by the initial capacity (specification information). Consequently, first SOH information that indicates the capacity retention rate of the battery 12 at the present time can be obtained.

The management center 500 can also obtain the internal resistance of the battery 12 based on the charge data. Transitions in current and voltage during external charge are varied in accordance with the internal resistance of the battery 12. The management center 500 may obtain the internal resistance of the battery 12 from the relationship (e.g. the slope of the graph) between the current and the voltage indicated by the charge data. The charge data may further include data that indicate various charge conditions (e.g. temperature, charge time, etc.). The management center 500 may correct the degree of deterioration of the battery 12 obtained from at least one of the current and the voltage of the battery 12 during external charge for a charge condition using deterioration degree correction information (such as a formula, a map, and a model) about a charge condition determined in accordance with the properties of the battery 12.

Subsequently, in S42, the management center 500 obtains second SOH information that indicates the degree of deterioration of the battery 12 based on history data about deterioration of the battery 12 recorded in the vehicle 10. The process in S42 is the same as the process in S31 in FIG. 2, for example. In S42, however, the management center 500 obtains second SOH information using the history data acquired in S40. Consequently, second SOH information that indicates the capacity retention rate of the battery 12 at the present time can be obtained.

Subsequently, in S43, the management center 500 obtains an SOH deviation degree for the first SOH information (S41) and the second SOH information (S42) obtained as described above. The SOH deviation degree indicates the degree of deviation between the capacity retention rate indicated by the first SOH information and the capacity retention rate indicated by the second SOH information, and may indicate the difference (absolute value) or the ratio between the two capacity retention rates, for example. The degree of deviation is greater as the difference (absolute value) is larger, and is smaller as the ratio is closer to 1.

Subsequently, in S44, the management center 500 determines based on the SOH deviation degree obtained in S43 whether the history data acquired in S40 have been tampered with. When the degree of deviation indicated by the SOH deviation degree is more than a predetermined level, the management center 500 determines that the history data have been tampered with (YES in S44), and executes the processes in S45 and S46, after which the process proceeds to S48. When the degree of deviation indicated by the SOH deviation degree is less than the predetermined level, on the other hand, the management center 500 determines that the history data have not been tampered with (NO in S44), and executes the process in S47, after which the process proceeds to S48.

When it is determined that the history data have been tampered with, the management center 500 specifies a tampered portion of the history data and deletes the tampered portion from the history data in S45. The management center 500 may specify abnormal data (a tampered portion) by performing a data analysis of the history data. Subsequently, in S46, the management center 500 transmits history data from which the tampered portion has been deleted to the vehicle 10 together with the determination result indicating that the history data have been tampered with. When it is determined that the history data have not been tampered with, on the other hand, the management center 500 transmits the determination result indicating that the history data have not been tampered with to the vehicle 10 in S47.

In S48, the management center 500 acquires battery value information based on the capacity retention rate of the battery 12 indicated by the first SOH information obtained in S41. The process in S48 is the same as the process in S32 in FIG. 2 except that the first SOH information is used in place of the second SOH information. The first SOH information indicates the capacity retention rate of the battery 12 with higher precision than the second SOH information. Subsequently, in S49, the management center 500 transmits the battery value information acquired in S48 to the vehicle 10. Then, the informing process in S29 in FIG. 4 discussed earlier is executed based on the battery value information transmitted in S49. When the process in S49 is executed, the series of processes illustrated in FIG. 5 is ended.

Figure 6:
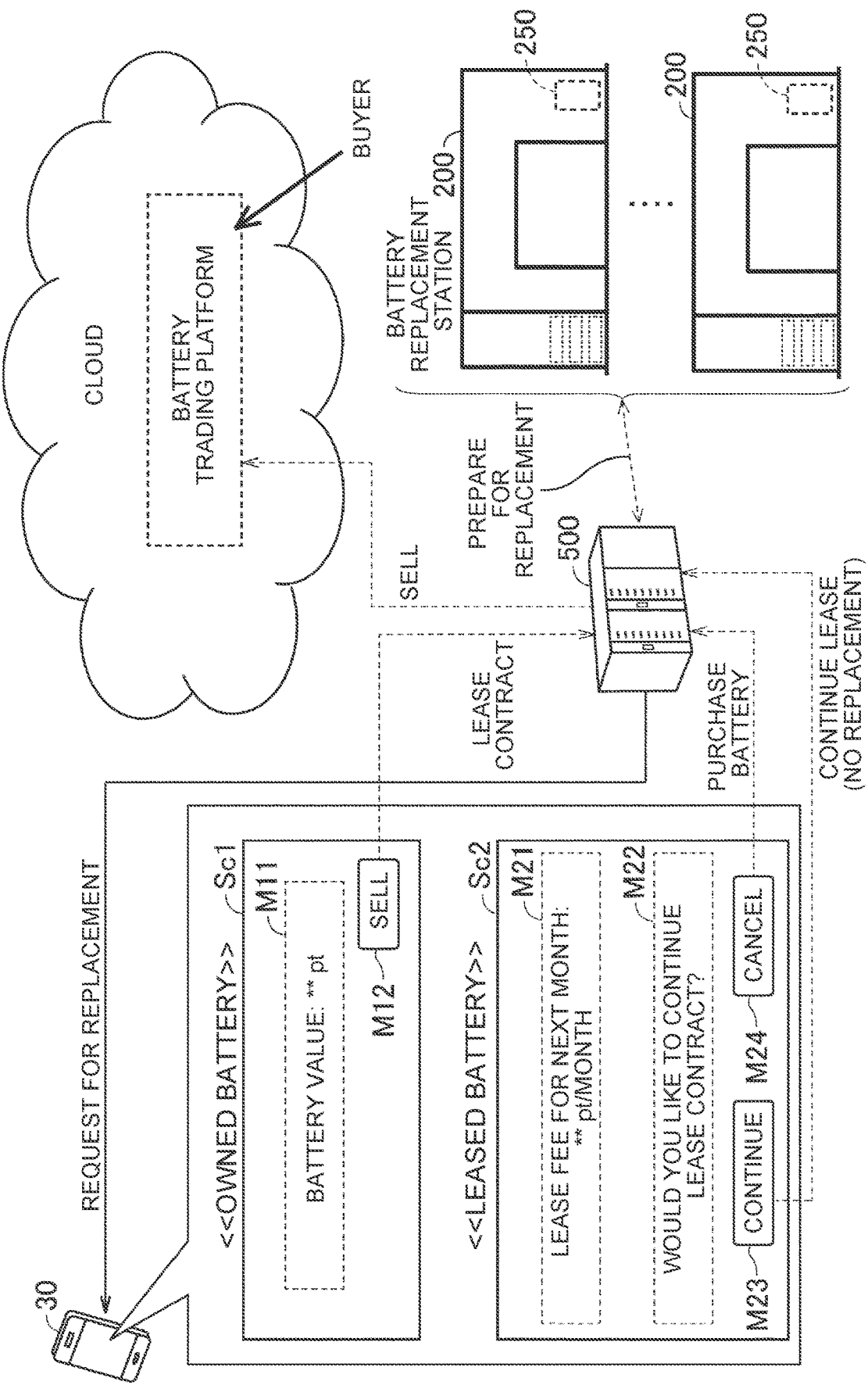
FIG. 6 illustrates an informing process illustrated in FIGS. 2 and 4.

FIG. 6 illustrates an informing process in each of S15 in FIGS. 2 and S29 in FIG. 4. With reference to FIG. 6, the portable terminal 30 displays a screen Sc1 or Sc2, for example, in each of S15 in FIGS. 2 and S29 in FIG. 4. However, this is not limiting, and the in-vehicle HMI may display the screen Sc1 or Sc2 in place of the portable terminal 30.

Particularly, when the vehicle 10 is the vehicle C (sold vehicle), the portable terminal 30 displays the screen Sc1 in accordance with an instruction from the vehicle 10 (ECU 111). The screen Sc1 includes an information section M11 and an operation section M12. The information section M11 displays the sales price (battery value information) of the battery 12 obtained by the management center 500. The operation section M12 is an operation section that receives a request to sell a battery from the vehicle user. The vehicle user can sell the battery 12 to the automobile manufacturer (lease business operator) at the price indicated by the information section M11 by operating the operation section M12.

When the vehicle 10 is a leased vehicle (vehicle A or vehicle B), the portable terminal 30 displays the screen Sc2 in accordance with an instruction from the vehicle 10 (ECU 111). The screen Sc2 includes information sections M21 and M22 and operation sections M23 and M24. The information section M21 displays the lease fee (battery value information) for the next unit period (e.g. next month) obtained by the management center 500. For the vehicle A, the lease fee of the battery 12 is displayed in the information section M21. For the vehicle B, the lease fee of the vehicle 10 is displayed in the information section M21. The information section M22 displays a message about the operation sections M23 and M24. The operation section M23 is an operation section that receives a request to continue the lease contract from the vehicle user. The operation section M24 is an operation section that receives a request to cancel the lease contract from the vehicle user. The vehicle user can select to continue and cancel the lease contract using the operation sections M23 and M24.

When one of the operation sections M12, M23, and M24 is operated by the vehicle user, a third request signal that indicates which of the operation sections has been operated is transmitted from the portable terminal 30 or the vehicle 10 to the management center 500. When the third request signal is received, the management center 500 starts a series of processes illustrated in FIG. 7 to be described below.

Figure 7:
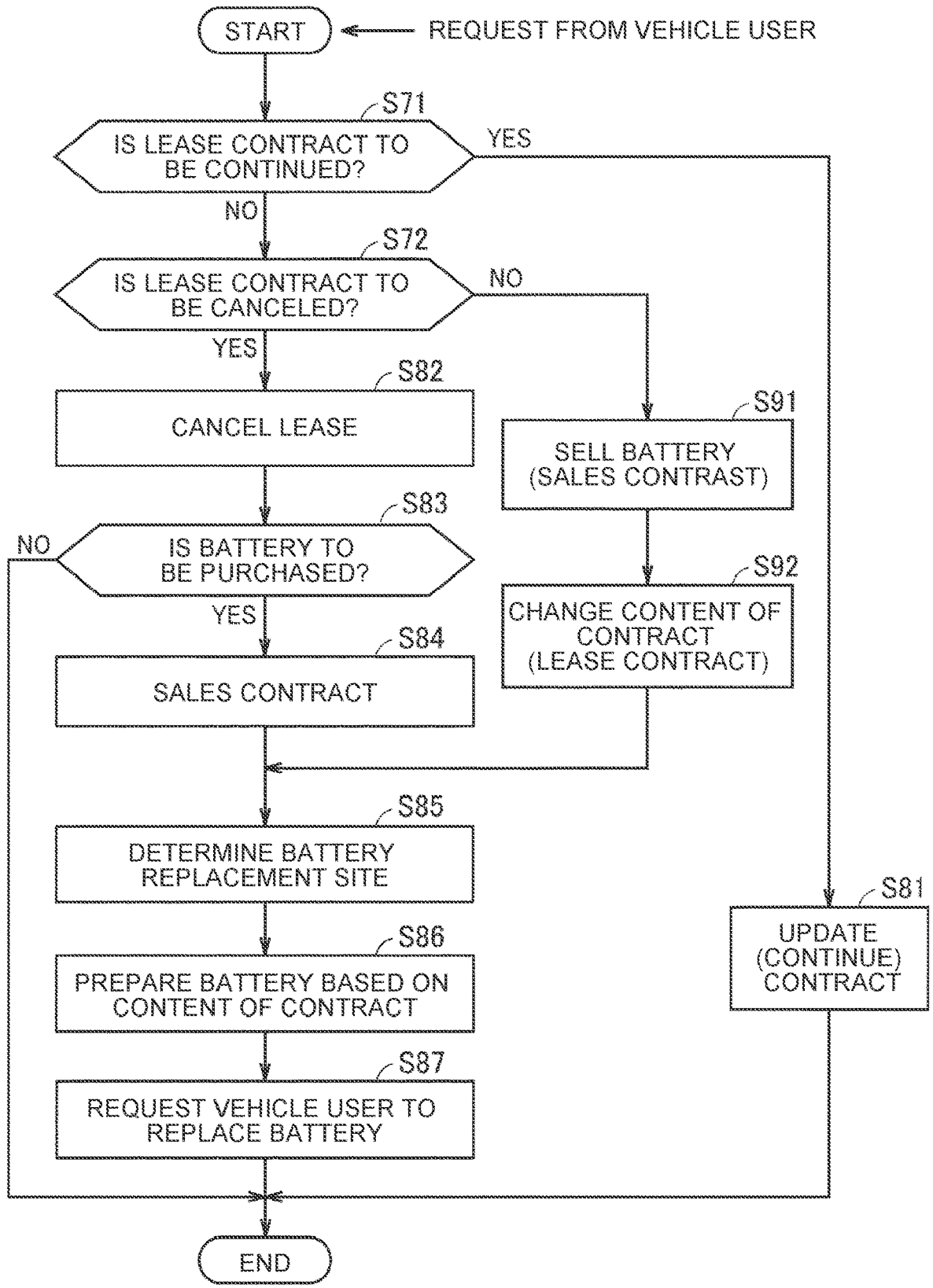
FIG. 7 is a flowchart illustrating a process related to a contract executed by the management center illustrated in FIG. 1.

FIG. 7 is a flowchart illustrating a process related to a contract executed by the management center 500. With reference to FIG. 7 together with FIG. 6, the management center 500 determines which of the operation sections M12, M23, and M24 has been operated in S71 and S72.

When the third request signal indicates that the operation section M23 (to continue the lease contract) on the screen Sc2 illustrated in FIG. 6 has been operated, the result of the determination in S71 is YES, and the management center 500 executes a contract update procedure for continuing the lease contract in subsequent S81. When the procedure is completed, the management center 500 notifies the user terminal for the vehicle 10 that the lease contract has been continued.

When the third request signal indicates that the operation section M24 (to cancel the lease contract) on the screen Sc2 illustrated in FIG. 6 has been operated, the result of the determination in S71 is No and the result of the determination in S72 is YES, and the management center 500 executes a procedure for canceling the lease contract in subsequent S82. When the procedure for cancellation is completed, the management center 500 notifies the user terminal for the vehicle 10 that the lease contract has been canceled, and requests the vehicle user for a response as to whether to purchase a replacement battery from the automobile manufacturer (lease business operator). The management center 500 stands by for a response from the vehicle user. When a response is received, the management center 500 determines in S83 whether a battery is to be purchased. When the vehicle user has made a response indicating that the vehicle user is not purchasing a replacement battery, the result of the determination in S83 is NO. The result of the determination in S83 is NO also when no response is received even after the lapse of a predetermined time since the management center 500 requested a response. When the result of the determination in S83 is NO, the series of processes illustrated in FIG. 7 is ended. In this case, the automobile manufacturer dispatches a service person to the home of the vehicle user, for example, to collect the battery 12 (leased power storage device) from the vehicle 10.

When the vehicle user has made a response indicating that the vehicle user is purchasing a replacement battery, on the other hand, the result of the determination in S83 is YES, and the management center 500 executes a procedure for a battery sales contract (a contract for the vehicle user to purchase a battery from the automobile manufacturer) in subsequent S84. The contract is concluded when the management center 500 and the user terminal for the vehicle 10 exchange necessary information (e.g. information that indicates conditions such as price) and reach an agreement. The vehicle user may be allowed to select the type of the battery (e.g. whether new or used). In addition, the vehicle user may be allowed to specify a battery pickup site. When a battery sales contract is concluded between the automobile manufacturer and the vehicle user, the management center 500 determines a battery replacement site (e.g. one of the dealers 100 and the BSta 200) in S85. When the vehicle user specifies a battery pickup site, the management center 500 determines the specified site as the battery replacement site. Subsequently, in S86, the management center 500 prepares a battery determined by the contract. Specifically, the management center 500 requests a terminal (server 150 or 250) at the battery replacement site determined in S85 to secure a battery determined by the contract. After that, in S87, the management center 500 sends the user terminal for the vehicle 10 a notification requesting that the battery of the vehicle 10 should be replaced at the battery replacement site determined in S85.

When the vehicle 10 arrives at the battery replacement site, the battery 12 (leased power storage device) mounted on the vehicle 10 is replaced with the battery determined by the contract (battery purchased by the vehicle user) at the battery replacement site. When the battery replacement site is one of the dealers 100, the battery is replaced by a service person. When the battery replacement site is one of the BSta 200, the battery is replaced fully automatically. The automobile manufacturer may lease the returned battery 12 to a different vehicle user, or may reuse the battery 12 for purposes other than automobiles (such as stationary use). Alternatively, the automobile manufacturer may sell the returned battery 12 through a battery trading platform on the cloud illustrated in FIG. 6. The battery trading platform is configured to match sellers and buyers of vehicle batteries and make sales contracts online.

When the third request signal indicates that the operation section M12 (to sell the battery) on the screen Sc1 illustrated in FIG. 6 has been operated, the results of the determinations in both S71 and S72 are NO, and the management center 500 executes a procedure for a battery sales contract (a contract for the automobile manufacturer to buy the battery 12 from the vehicle user) in subsequent S91. The contract is concluded when the management center 500 and the user terminal for the vehicle 10 exchange necessary information (e.g. information that indicates conditions such as price) and reach an agreement. In this example, it is a necessary condition for a battery sales contract that the vehicle user should conclude a partial lease contract with the automobile manufacturer (lease business operator). When a battery sales contract is concluded in S91, the management center 500 executes a procedure for a partial lease contract in subsequent S92. In this event, the vehicle user may be allowed to select the type of the battery. In addition, the vehicle user may be allowed to specify a battery pickup site.

When a battery sales contract and a partial lease contract are concluded in S91 and S92, respectively, the processes in S85 to S87 discussed earlier are executed. Consequently, the battery 12 mounted on the vehicle 10 (battery sold by the vehicle user) is replaced with the battery provided from the automobile manufacturer by lease at the battery replacement site determined in S85. The automobile manufacturer may lease the sold battery 12 to a different vehicle user, or may reuse the battery 12 for purposes other than automobiles (such as stationary use). Alternatively, the automobile manufacturer may sell the sold battery 12 through a battery trading platform on the cloud illustrated in FIG. 6.

On the screen Sc1 illustrated in FIG. 6, the information section M11 displays the sales price of the battery 12. However, this is not limiting, and the information section M11 may display the sales price (battery value information) of the vehicle 10 obtained by the management center 500 in place of the sales price of the battery 12, and the operation section M12 may receive a request to sell the vehicle from the vehicle user. The vehicle user may be allowed to sell the vehicle 10 to the automobile manufacturer (lease business operator) at the price indicated in the information section M11 by operating the operation section M12. In addition, the portable terminal 30 may be configured to switch between the battery selling screen and the vehicle selling screen discussed above in accordance with a user operation.

As described above, the vehicle management method according to this embodiment includes the processes illustrated in FIGS. 2, 4, 5, and 7. In this embodiment, the ECU 111, the portable terminal 30, and the management center 500 correspond to an example of the "computer system" according to the present disclosure. The processes are executed by one or more processors executing a program stored in one or more storage devices. However, the processes may be executed by dedicated hardware (electronic circuitry), rather than by software.

The vehicle management method according to this embodiment includes: obtaining first SOH information that indicates the degree of deterioration of the power storage device (battery 12) of the vehicle 10 based on charge data on the power storage device measured while the vehicle 10 is executing external charge of the power storage device using power supplied externally (S41 in FIG. 5); obtaining second SOH information that indicates the degree of deterioration of the power storage device based on history data about deterioration of the power storage device recorded in the vehicle 10 when the vehicle 10 is not executing external charge of the power storage device (S42 in FIG. 5); and determining whether the history data have been tampered with by comparing the first SOH information and the second SOH information (S43 and S44 in FIG. 5). With such a method, it is possible to confirm whether the history data on the power storage device of the vehicle 10 have been tampered with.

The vehicle management method according to this embodiment further includes determining whether the charge data for obtaining the first SOH information have been measured (S24 to S26 in FIG. 4). When the results of the determinations in all of S24 to S26 in FIG. 4 are YES, the management center 500 is requested in S27 to determine tampering with the history data, and the series of processes (including S43 and S44) illustrated in FIG. 5 is executed. The determining as to whether the history data have been tampered with includes determining whether the history data have been tampered with (S43 and S44 in FIG. 5) by comparing the first SOH information that indicate the present degree of deterioration of the power storage device and the second SOH information when it is determined that the charge data for obtaining the first SOH information have been measured. With such a method, it is possible to confirm whether the history data on the power storage device of the vehicle have been tampered with when charge data for obtaining first SOH information are acquired. In addition, the first SOH information and the second SOH information can be easily compared under the same condition, since the first SOH information and the second SOH information indicate the degrees of deterioration at the same timing. This enhances the precision in determining tampering.

The vehicle management method according to this embodiment further includes deleting a tampered portion of the history data (S45 in FIG. 5) when it is determined that the history data have been tampered with. With such a method, it is possible to appropriately obtain second SOH information using a non-tampered portion of the history data after tampering with the history data has been detected.

The vehicle management method according to this embodiment further includes: calculating a lease fee of the vehicle or the power storage device based on the second SOH information (S32 in FIG. 2) when the vehicle or the power storage device is provided to a vehicle user by lease; and informing the vehicle user of the calculated lease fee (S15 in FIG. 2). With such a method, it is possible to inform the vehicle user of the lease fee calculated based on the reliable second SOH information while confirming whether the history data have been tampered with. By using the second SOH information, in addition, it is possible to acquire the degree of deterioration of the power storage device during a period for which the vehicle 10 is not executing external charge.

In the vehicle management method discussed above, in addition, the second SOH information is used not only to obtain a lease fee, but also to obtain the sales price of the power storage device that has been used (or the sales price of the vehicle on which the power storage device that has been used is mounted) (see FIG. 6). However, the purpose of use of the second SOH information is not limited thereto, and the second SOH information may be used for any purpose. The second SOH information may be used to determine whether the power storage device that has been used is reusable. In the above embodiment, the length (unit period) of the lease period is defined as one month. However, this is not limiting. The unit period may be set as desired, and may be set to a period that is longer than one month (e.g. three months or one year).

The vehicle management system according to this embodiment includes: a vehicle 10 including a power storage device (battery 12) and a storage device 111b; power supply equipment (EVSE 20) that supplies power for external charge of the power storage device; and a server (management center 500) configured to be communicable with each of the vehicle 10 and the power supply equipment. The vehicle 10 is configured to record history data about deterioration of the power storage device in the storage device 111b when external charge of the power storage device is not executed (see S11 and S12 in FIG. 2). The server is configured to acquire charge data on the power storage device from the vehicle 10 or the power supply equipment after the vehicle 10 executes external charge of the power storage device using the power supply equipment, the charge data being measured during the external charge (sec S27 in FIGS. 4 and S40 in FIG. 5), obtain first SOH information that indicates a degree of deterioration of the power storage device based on the charge data on the power storage device (see S41 in FIG. 5), acquire the history data on the power storage device from the vehicle or the power supply equipment (see S27 in FIGS. 4 and S40 in FIG. 5), obtain second SOH information that indicates a degree of deterioration of the power storage device based on the history data on the power storage device (see S42 in FIG. 5), and determine whether the history data have been tampered with by comparing the first SOH information and the second SOH information (see S43 and S44 in FIG. 5). With such a system, the vehicle management method discussed earlier is executed suitably.

While the time of start of use is used as the "reference time" in S14 and S31 in FIGS. 2 and S27 in FIG. 4 in the above embodiment, the reference time is changeable as appropriate. For example, the reference time may be the initial time (time of shipment). Alternatively, the reference time may be the time when external charge was executed most recently (the time of the preceding external charge). In S31 in FIG. 2, the management center 500 may obtain the capacity retention rate of the battery 12 at the present time based on the capacity retention rate (S41 in FIG. 5) obtained based on charge data at the time of the preceding external charge and the amount of reduction in the capacity retention rate since the time of the preceding external charge until the present time obtained based on the history data since the time of the preceding external charge until the present time.

The process flows illustrated in FIGS. 2, 4, 5, and 7 are changeable as appropriate. For example, the order of the processes may be changed, and unnecessary steps may be omitted, depending on the purpose. In addition, the content of any of the processes may be changed. For example, S25 and S26 may be omitted from the processes illustrated in FIG. 4.

Figure 8:
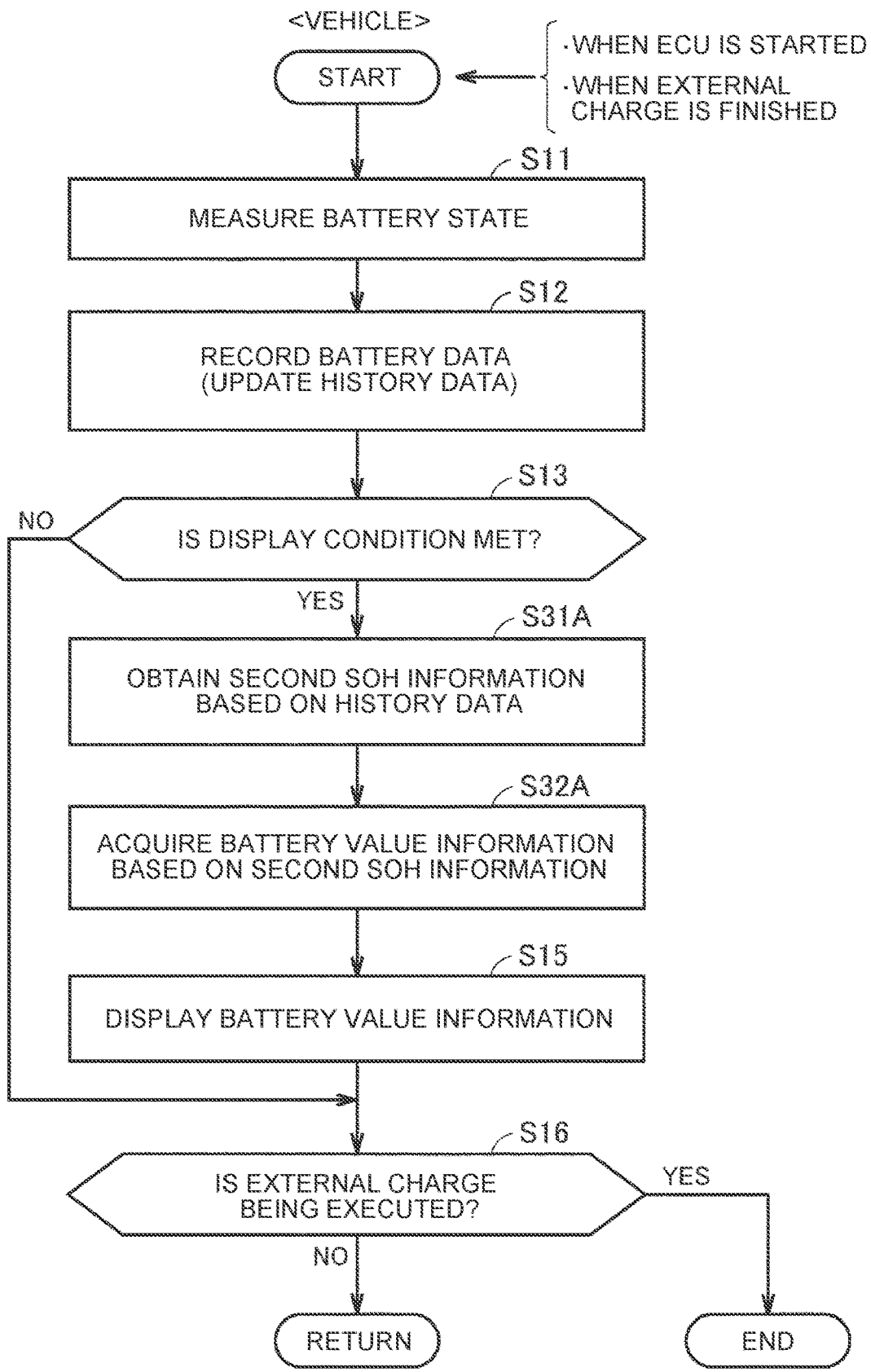
FIG. 8 is a flowchart illustrating a first modification of the process illustrated in FIG. 2.

In the vehicle management method according to the above embodiment, the vehicle 10 requests the management center 500 for battery value information, and the management center 500 executes a process of obtaining battery value information (see FIG. 2). However, this is not limiting, and the vehicle 10 itself may be configured to obtain battery value information. FIG. 8 is a flowchart illustrating a first modification of the process illustrated in FIG. 2. The vehicle 10 may execute a process illustrated in FIG. 8 to be described below, in place of the process illustrated in FIG. 2.

With reference to FIG. 8, in this modification, when a display condition is met (YES in S13), the ECU 111 of the vehicle 10 itself obtains second SOH information based on history data (S31A) without requesting battery value information (S14 in FIG. 2), and acquires battery value information based on the obtained second SOH information (S32A). S31A and S32A may be the same as S31 and S32, respectively, in FIG. 2. However, the vehicle 10 may acquire information (e.g. price information that indicates the relationship between the battery deterioration degree and the battery value information) that is necessary to obtain battery value information from the management center 500.

Figure 9:
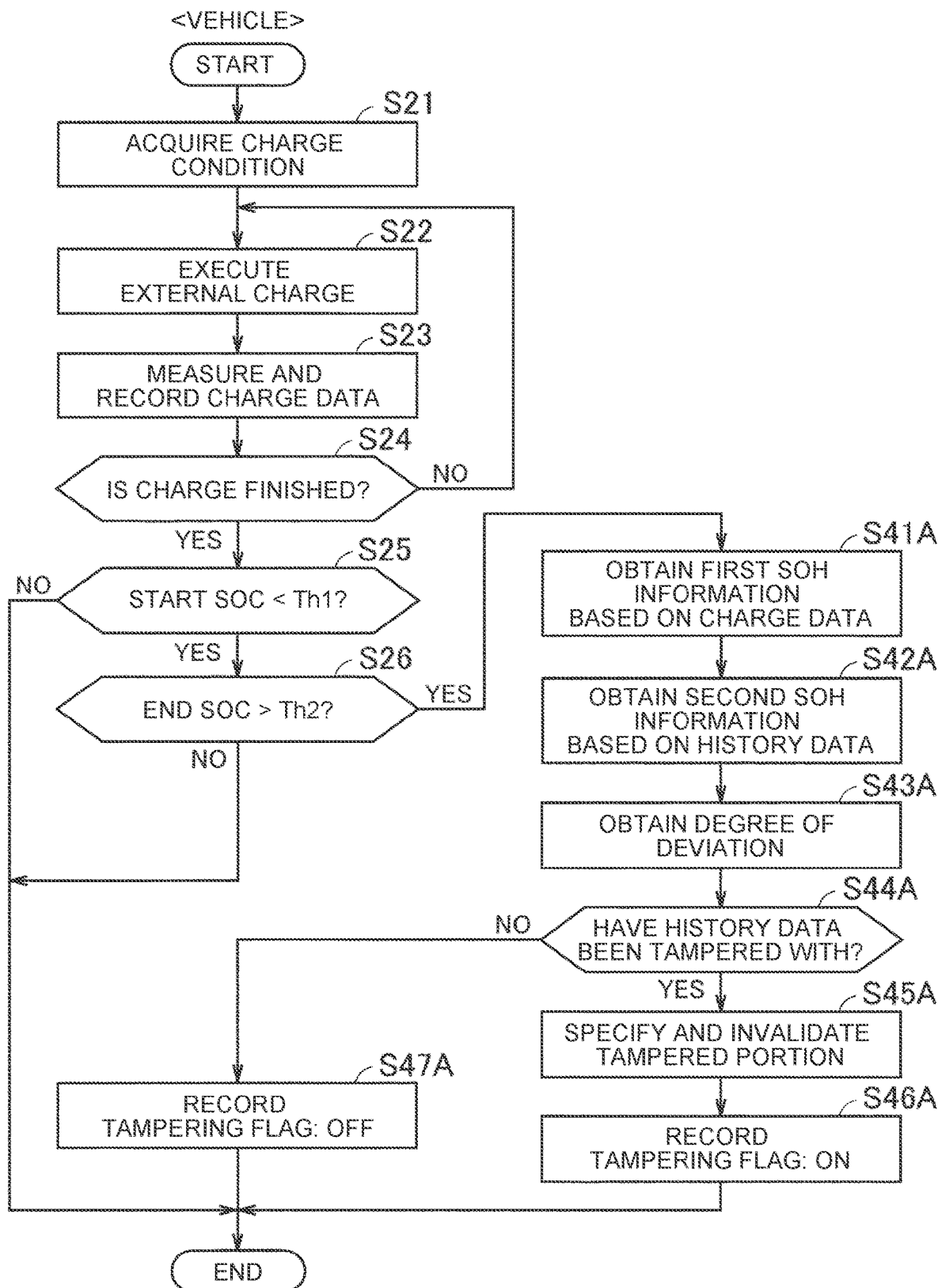
FIG. 9 is a flowchart illustrating a modification of the processes illustrated in FIGS. 4 and 5.

In the vehicle management method according to the above embodiment, the vehicle 10 requests the management center 500 to determine tampering with the history data, and the management center 500 executes determination of tampering (see FIGS. 4 and 5). However, this is not limiting, and the vehicle 10 itself may be configured to execute determination of tampering. FIG. 9 is a flowchart illustrating a modification of the processes illustrated in FIGS. 4 and 5. The vehicle 10 may execute a process illustrated in FIG. 9 to be described below, in place of the process illustrated in FIG. 4.

With reference to FIG. 9, in this modification, when the results of the determinations in all of S24 to S26 are YES, the ECU 111 of the vehicle 10 itself executes determination of tampering through the processes in S41A to S44A without requesting determination of tampering (S27 in FIG. 4). S41A, S42A, S43A, and S44A may be the same as S41, S42, S43, and S44, respectively, in FIG. 5. When it is determined that the history data have been tampered with (YES in S44A), the ECU 111 specifies a tampered portion of the history data and invalidates the tampered portion of the history data in S45A. Consequently, use of the tampered portion is prohibited. Subsequently, in S46A, the ECU 111 records the determination result indicating that the history data have been tampered with (tampering flag: ON) in the storage device 111b in connection with the determination time. When it is determined that the history data have not been tampered with (NO in S44A), on the other hand, the ECU 111 records the determination result indicating that the history data have not been tampered with (tampering flag: OFF) in the storage device 111b in connection with the determination time in S47A.

In the vehicle management method according to the above embodiment, it is determined whether the history data have been tampered with (see FIGS. 4 and 5) by comparing the first SOH information and the second SOH information for the same time. However, this is not limiting, and it may be determined whether the history data have been tampered with by comparing first SOH information and second SOH information for different times. The time for SOH information indicates the degree of deterioration at what time is indicated by the SOH information. For example, when the time for SOH information is "DD (h):EE (m) on BB (M)/CC (D)/AAAA (Y)" it is meant that the SOH information indicates the degree of deterioration of the power storage device at "DD (h): EE (m) on BB (M)/CC (D)/AAAA (Y)".

Figure 10:
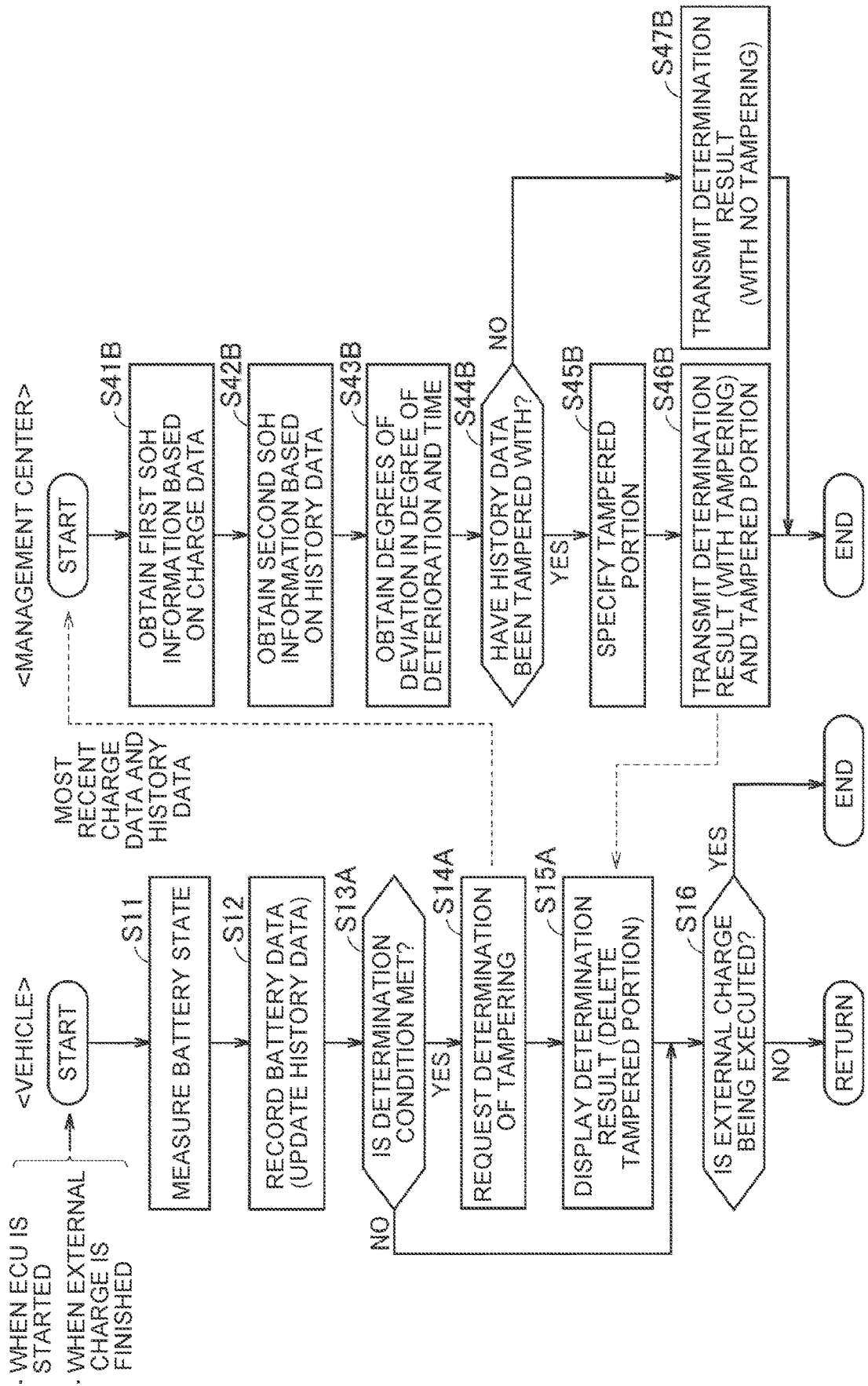
FIG. 10 is a flowchart illustrating a second modification of the process illustrated in FIG. 2.

FIG. 10 is a flowchart illustrating a second modification of the process illustrated in FIG. 2. The vehicle 10 may execute a process illustrated in FIG. 10 to be described below, in place of the process illustrated in FIG. 2. In the vehicle management method according to this modification, determination of tampering is also executed by the process illustrated in FIG. 10, in addition to the processes illustrated in FIGS. 4 and 5.

With reference to FIG. 10, in this modification, S13A, S14A, and S15A are used in place of S13, S14, and S15, respectively, in FIG. 2. In S13A, the ECU 111 determines whether a predetermined determination condition is met. The determination condition is met when the ECU 111 is requested to determine tampering with the history data from a user terminal (e.g. an in-vehicle HMI or the portable terminal 30) for the vehicle 10 in response to a user operation, for example. However, this is not limiting, and the determination condition may be set as desired.

When the determination condition is met (YES in S13A), the processes in S14A and S15A are executed, and thereafter the process proceeds to S16. When the determination condition is not met (NO in S13A), the process proceeds to S16 without executing the processes in S14A and S15A. In S14A, the ECU 111 requests the management center 500 to determine tampering with the history data. Specifically, the ECU 111 transmits, to the management center 500, a fourth request signal that includes identification information (vehicle ID) on the vehicle 10, the most recent charge data (battery data measured during the preceding external charge), and the history data since the reference time until the present time. Since the most recent charge data have been recorded in the storage device 111b in S23 in FIG. 4 during the preceding external charge, the ECU 111 can acquire the most recent charge data from the storage device 111b. When the request is received, the management center 500 starts a series of processes in S41B to S47B.

In S41B, the management center 500 obtains first SOH information that indicates the degree of deterioration of the battery 12 at the time of the preceding external charge based on the most recent charge data included in the fourth request signal. That is, the time for the first SOH information is the time when external charge was executed most recently (e.g. the time of start of the preceding external charge).

Subsequently, in S42B, the management center 500 obtains second SOH information that indicates the degree of deterioration of the battery 12 at the present time based on the history data included in the fourth request signal. That is, the time for the second SOH information is the present time.

Subsequently, in S43B, the management center 500 obtains an SOH deviation degree that indicates the degree of deviation between the degree of deterioration indicated by the first SOH information and the degree of deterioration indicated by the second SOH information and a time deviation degree that indicates the degree of deviation between the time for the first SOH information and the time for the second SOH information. The management center 500 may acquire the difference (absolute value) or the ratio between the two degrees of deterioration as the SOH deviation degree. Meanwhile, the management center 500 may acquire the difference (absolute value) or the ratio between the two times as the time deviation degree.

Subsequently, in S44B, the management center 500 determines based on the SOH deviation degree and the time deviation degree whether the history data have been tampered with. Specifically, the time for the first SOH information is earlier than the time for the second SOH information. Since the deterioration of the battery 12 progresses as the time elapses, the management center 500 converts the degree of deterioration of the battery 12 indicated by the first SOH information into the degree of deterioration of the battery 12 at the present time (time for the second SOH information) based on the time deviation degree. The management center 500 may add a deterioration progress degree that matches the time deviation degree to the degree of deterioration of the battery 12 indicated by the first SOH information. Then, the management center 500 compares the degree of deterioration of the battery 12 at the present time obtained from the first SOH information in this manner and the degree of deterioration of the battery 12 at the present time indicated by the second SOH information and, when the degree of deviation between the two degrees of deterioration is more than a predetermined level, determines that the history data have been tampered with (YES in S44B) and executes the processes in S45B and S46B. The management center 500 specifies a tampered portion of the history data in S45B, and transmits tampering information that indicates the tampered portion of the history data to the vehicle 10 together with the determination result indicating that the history data have been tampered with in subsequent S46B. When the degree of deviation between the two degrees of deterioration is less than the predetermined level, on the other hand, the management center 500 determines that the history data have not been tampered with (NO in S44B), and executes the process in S47B. In S47B, the management center 500 transmits the determination result indicating that the history data have not been tampered with to the vehicle 10.

When the determination result is received from the management center 500, the ECU 111 of the vehicle 10 executes the process in S15A. In S15A, the ECU 111 informs the vehicle user of the result of the determination of tampering with the history data. Specifically, the ECU 111 controls the user terminal for the vehicle 10 (e.g. the in-vehicle HMI or the portable terminal 30) so as to display the determination result (whether the history data have or have not been tampered with). When the determination result indicates that the history data have been tampered with, the ECU 111 deletes the tampered portion of the history data based on the tampering information received from the management center 500 in S15A. After that, the process proceeds to S16.

The vehicle management method according to the above modification includes: obtaining an SOH deviation degree that indicates a degree of deviation between the degree of deterioration indicated by the first SOH information and the degree of deterioration indicated by the second SOH information (S43B); obtaining a time deviation degree that indicates a degree of deviation between a time for the first SOH information and a time for the second SOH information (S43B); and determining based on the SOH deviation degree and the time deviation degree whether the history data have been tampered with (S44B). With such a method, the precision in determining tampering is enhanced by comparing the degrees of deterioration indicated by the first SOH information and the second SOH information and the times for the first SOH information and the second SOH information. S13 to S15 and S31 to S33 illustrated in FIG. 2 may be added to the process illustrated in FIG. 10.

The functions implemented by the management center 500 in the above embodiment may be implemented by the server 150 (dealer terminal). In this embodiment, the management center 500, the servers 150, and the servers 250 are all on-premise servers. However, this is not limiting, and the functions of the servers may be implemented on the cloud through cloud computing. That is, these servers may be cloud servers. The locations at which the lease service is provided are not limited to the dealers 100. For example, the management center 500 may provide the lease service online (e.g. on the cloud). There may be only one type of leasing method (e.g. partial leasing).

While only a battery is replaced in the above embodiment, a battery pack including a battery and auxiliary components may be replaced as a whole. The vehicle may be configured to be chargeable in a non-contact manner. The vehicle to be charged in a non-contact manner may be considered as being in a state similar to the "plug-in state" for contact charge (cable charge) discussed earlier when a power transmission portion (e.g. a power transmission coil) on the power supply equipment side and a power reception portion (e.g. a power reception coil) on the vehicle side are completely aligned with each other.

The vehicle may be an electrified vehicle (xEV) other than BEVs. The vehicle may be a plug-in hybrid electric vehicle (PHEV) that includes an internal combustion engine. The vehicle is not limited to a four-wheeled passenger vehicle, and may be a bus, a truck, or an xEV with three or five or more wheels. The vehicle may include a solar panel. The vehicle may be configured to be capable of autonomous driving, or may be provided with a flight function. The vehicle may be a vehicle capable of unmanned travel (e.g. a robotaxi, an automated guided vehicle, or an agricultural machine).

The embodiment disclosed herein should be considered to be illustrative and not restrictive in all respects. The scope of the present disclosure is set forth by the claims rather than by the above description of the embodiment, and is intended to include all modifications within the meaning and the scope equivalent to the claims.

What is claimed is:

1. A vehicle management method comprising:
   obtaining, by an electronic control unit (ECU), a first state-of-health (SOH) information that indicates a degree of deterioration of a power storage device of a vehicle based on charge data on the power storage device measured by a battery sensor while the vehicle is executing external charge of the power storage device using power supplied externally;
   obtaining, by the ECU, a second SOH information that indicates the degree of deterioration of the power storage device based on history data recorded in the vehicle when the vehicle is not executing external charge of the power storage device, the history data including at least one of temperature, voltage, current, or state of charge of the power storage device;

determining, by the ECU, whether the history data has been tampered with by comparing the first SOH information and the second SOH information; and in response to determining that the history data has been tampered with, deleting a tampered portion of the history data stored in a memory of the vehicle.

2. The vehicle management method according to claim 1, further comprising determining whether the charge data for obtaining the first SOH information has been measured, wherein the determining as to whether the history data has been tampered with includes determining whether the history data has been tampered with by comparing the first SOH information that indicate a present degree of deterioration of the power storage device and the second SOH information when it is determined that the charge data for obtaining the first SOH information has been measured.

3. The vehicle management method according to claim 1, wherein the determining as to whether the history data has been tampered with includes obtaining an SOH deviation degree that indicates a degree of deviation between the degree of deterioration indicated by the first SOH information and the degree of deterioration indicated by the second SOH information, obtaining a time deviation degree that indicates a degree of deviation between a time for the first SOH information and a time for the second SOH information, and determining based on the SOH deviation degree and the time deviation degree whether the history data has been tampered with.

4. The vehicle management method according to claim 1, further comprising:

calculating a lease fee of the vehicle or the power storage device based on the second SOH information when the vehicle or the power storage device is provided to a vehicle user by lease; and informing the vehicle user of the calculated lease fee.

5. The vehicle management method according to claim 1, wherein:

the charge data on the power storage device indicate at least one of a current and a voltage of the power storage device during external charge;

the history data on the power storage device indicate at least one of a state of the power storage device taken while the vehicle is traveling and a state of the power storage device taken when the vehicle is left alone; and each of the first SOH information and the second SOH information indicates a capacity retention rate or an internal resistance of the power storage device.

6. The vehicle management method according to claim 1, wherein the second SOH information is obtained based on history data about deterioration of the power storage device recorded in the vehicle since a reference time until immediately before start of external charge.

7. The vehicle management method according to claim 1, wherein the second SOH information is obtained when a display condition for displaying predetermined information is met.

8. A computer system comprising:

one or more processors; and one or more storage devices that store a program that causes the one or more processors to execute the vehicle management method according to claim 1.

9. A vehicle management system comprising:

a vehicle including a power storage device and a storage device;

power supply equipment that supplies power for external charge of the power storage device; and a server configured to be communicable with each of the vehicle and the power supply equipment, wherein the vehicle is configured to record history data about deterioration of the power storage device in the storage device when external charge of the power storage device is not executed, the history data including at least one of temperature, voltage, current, or state of charge of the power storage device, and the server is configured to acquire charge data on the power storage device from the vehicle or the power supply equipment after the vehicle executes external charge of the power storage device using the power supply equipment, the charge data being measured by a battery sensor during the external charge, obtain, from an electronic control unit (ECU) of the vehicle, first state-of-health (SOH) information that indicates a degree of deterioration of the power storage device based on the charge data on the power storage device, acquire the history data on the power storage device from the vehicle or the power supply equipment, obtain second SOH information that indicates a degree of deterioration of the power storage device based on the history data on the power storage device, and determine whether the history data has been tampered with by comparing the first SOH information and the second SOH information; and in response to a determination that the history data has been tampered, delete a tampered portion of the history data stored in the storage device of the vehicle.

* * * * *